(12) United States Patent
Tada et al.

(10) Patent No.: US 6,594,580 B1
(45) Date of Patent: Jul. 15, 2003

(54) APPARATUS AND SYSTEM FOR PROVIDING ROUTE GUIDANCE INFORMATION AND A COMMUNICATION TERMINAL THEREOF

(75) Inventors: Akihito Tada, Toyota (JP); Hironobu Sugimoto, Toyota (JP); Masayuki Yurimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/708,484

(22) Filed: Nov. 9, 2000

(30) Foreign Application Priority Data

Nov. 18, 1999 (JP) .......................... 11-328089
Oct. 5, 2000 (JP) .......................... 2000-305992

(51) Int. Cl.$^7$ .......................... G01C 21/00
(52) U.S. Cl. .......... 701/211; 701/202; 701/208; 340/990; 340/995; 342/357.09; 342/357.13
(58) Field of Search .............. 701/201, 208, 701/209, 210, 211; 342/357.09, 357.13; 340/989, 990, 995

(56) References Cited

U.S. PATENT DOCUMENTS

| | | | | |
|---|---|---|---|---|
| 4,954,958 A | * | 9/1990 | Savage et al. | 379/201.06 |
| 5,543,789 A | * | 8/1996 | Behr et al. | 340/990 |
| 5,559,707 A | * | 9/1996 | DeLorme et al. | 340/990 |
| 5,802,492 A | * | 9/1998 | DeLorme et al. | 340/990 |
| 5,850,618 A | * | 12/1998 | Suetsugu et al. | 701/200 |
| 5,948,040 A | * | 9/1999 | DeLorme et al. | 340/990 |
| 5,968,109 A | * | 10/1999 | Israni et al. | 701/208 |
| 6,021,371 A | * | 2/2000 | Fultz | 340/988 |
| 6,073,076 A | * | 6/2000 | Crowley et al. | 701/208 |
| 6,249,740 B1 | * | 6/2001 | Ito et al. | 340/910 |
| 6,334,087 B1 | * | 12/2001 | Nakano et al. | 701/208 |
| 6,334,089 B2 | * | 12/2001 | Hessing | 342/463 |

FOREIGN PATENT DOCUMENTS

| | | |
|---|---|---|
| EP | 0875878 A3 | 11/1998 |
| JP | 3194417 | 8/1991 |
| JP | 6261149 | 9/1994 |
| JP | 3040233 | 5/1997 |
| JP | 9-178499 A | 7/1997 |
| JP | 10-247298 | 9/1998 |
| JP | 10-300499 | 11/1998 |

* cited by examiner

Primary Examiner—Michael J. Zanelli
Assistant Examiner—Eric Gibson
(74) Attorney, Agent, or Firm—Oliff & Berridge, PLC

(57) ABSTRACT

A generation section for root guide information 25 retrieves a plurality of information elements from an information data storage section 23 and creates root guide information. Then, a generation part for guide information data blocks 26 reorganizes the root information into a plurality of guide information data blocks including at least one information element from the root guide information. The guide information data blocks generated through reorganizing are sequentially transmitted from a radio communication unit 27 to an in-vehicle device 30. When it becomes impossible to execute route guidance using one type of guide information because of a breakdown in communication or the like, route guidance can still be executed by using guide information already received.

33 Claims, 27 Drawing Sheets

| LOCATION | CATEGORY | INFORMATION ELEMENT | INFORMATION CLASS | | |
|---|---|---|---|---|---|
| | | | 1 | 2 | 3 |
| TARGET GUIDANCE POSITION Q | | COORDINATE DATA | O | | |
| | VISUAL DATA | INTERSECTION SHAPE DATA | | O | O |
| | | FACILITY DATA | | | O |
| | | ROAD WIDTH DATA | | | O |
| | | LANE GUIDE DATA | | | O |
| | | INTERSECTION DESIGNATION DATA | | O | O |
| | VOICE DATA | DISTANCE DATA | O | | |
| | | INTERSECTION DESIGNATION DATA | | O | |
| | | DIRECTION DATA | O | | |
| | | FACILITY DATA | | | O |

24

| INFORMATION CLASS | 1 | 2 | 3 |
|---|---|---|---|
| GUIDE LEVEL | I | II | III |

| LOCATION | CATEGORY | INFORMATION ELEMENT | INFORMATION CLASS 1 | INFORMATION CLASS 2 |
|---|---|---|---|---|
| P1 | | COORDINATE DATA | O | — |
| | VISUAL DATA | INTERSECTION SHAPE DATA | | O |
| | | FACILITY DATA | | O |
| | | ROAD WIDTH DATA | | O |
| | | LANE DATA | | O |
| | | INTERSECTION DESIGNATION DATA | | O |
| | VOICE DATA | DISTANCE DATA | O | |
| | | INTERSECTION DESIGNATION DATA | O | |
| | | DIRECTION DATA | O | |
| | | FACILITY DATA | O | |

| INFORMATION CLASS | 1 | 2 |
|---|---|---|
| GUIDE LEVEL | I | II |

Fig.5 (a)

LOCATION, CATEGORY

| | | INFORMATION ELEMENT | INFORMATION CLASS | | |
|---|---|---|---|---|---|
| | | | 1 | 2 | 3 |
| P1 | VISUAL DATA | COORDINATE DATA | ○ | | |
| | | INTERSECTION SHAPE DATA | | ○ | ○ |
| | | FACILITY DATA | | | ○ |
| | | ROAD WIDTH DATA | | | ○ |
| | | LANE GUIDE DATA | | | ○ |
| | | INTERSECTION DESIGNATION DATA | | ○ | ○ |
| | VOICE DATA | DISTANCE DATA | ○ | | |
| | | INTERSECTION DESIGNATION DATA | | ○ | |
| | | DIRECTION DATA | ○ | | |
| | | FACILITY DATA | | | ○ |

Fig.5 (b)

| INFORMATION CLASS | 1 | 2 | 3 |
|---|---|---|---|
| GUIDE LEVEL | I | II | III |

Fig.5 (c)

| | GUIDE LEVEL I | GUIDE LEVEL II | GUIDE LEVEL III |
|---|---|---|---|
| VISUAL GUIDANCE | NO MAP | ○○ INTER-SECTION | ○○ INTER-SECTION |
| VOICE GUIDANCE | TURN XX, IN 300M. | TURN XX, IN 300M, AT INTERSECTION ZZ. | TURN XX, IN 300M, NEXT TO YY, AT INTERSECTION ZZ. |

Fig.7 (a)
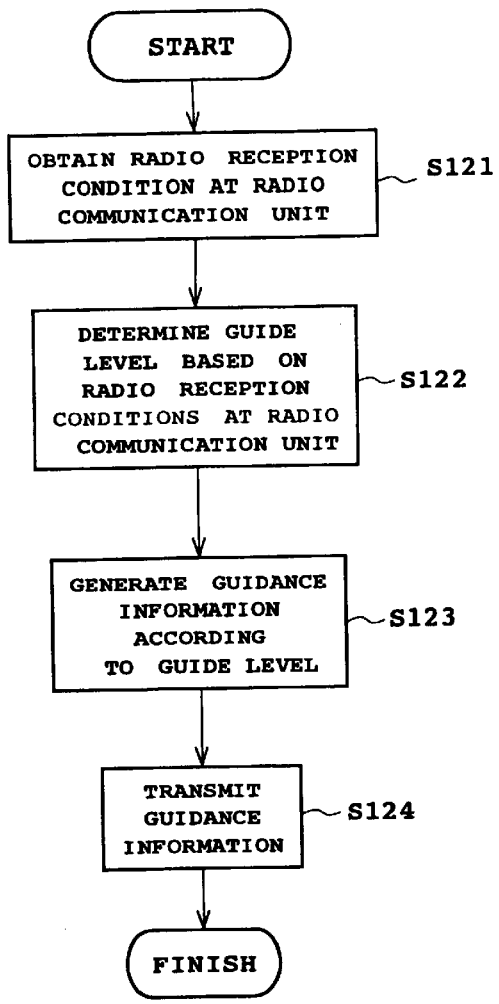
Fig.7 (b)
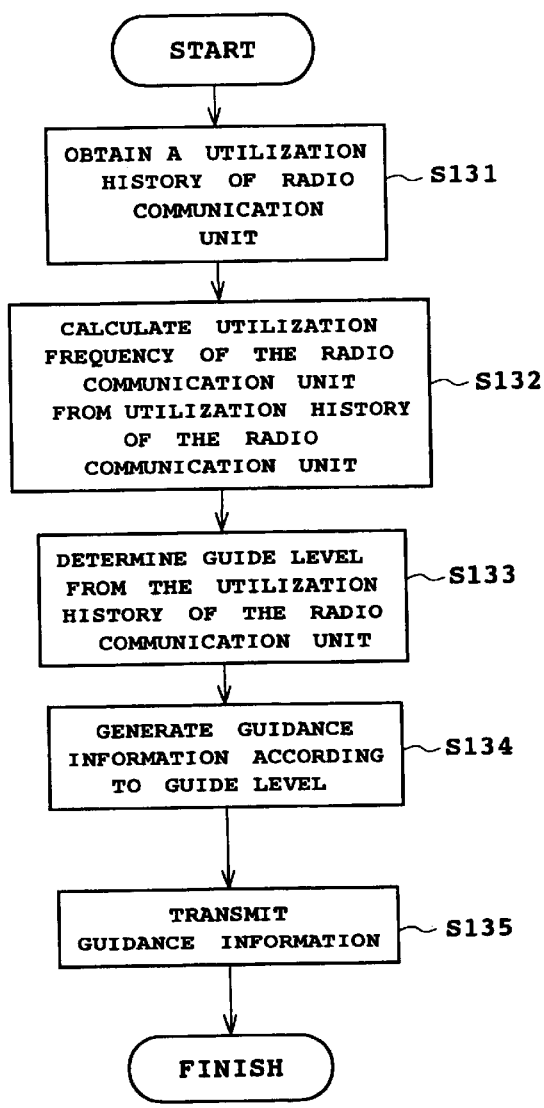
Fig.7 (c)
| INFORMATION CLASS | 1 | 2 | 3 |
|---|---|---|---|
| GUIDE LEVEL | | I | II |
Fig.7 (d)
| INFORMATION CLASS | 1 | 2 | 3 |
|---|---|---|---|
| GUIDE LEVEL | I | II | III |

Fig.9 (a)

LOCATION   CATEGORY

| | | INFORMATION | INFORMATION CLASS | | |
|---|---|---|---|---|---|
| | | | 1 | 2 | 3 |
| P1 | VOICE DATA | COORDINATE DATA | O | | |
| | | GRAPHIC DATA | | O | O |
| | | DISTANCE DATA | TEXT | TEXT&CONTROL | VOICE WAVEFORM |
| | | INTERSECTION DESIGNATION DATA | | | |
| | | DIRECTION DATA | TEXT | TEXT&CONTROL | VOICE WAVEFORM |
| | | FACILITY DATA | | | |

Fig.9 (b)

| INFORMATION CLASS | 1 | 2 | 3 |
|---|---|---|---|
| GUIDE LEVEL | I | II | III |

Fig.9 (c)

| | GUIDE LEVEL I | GUIDE LEVEL II | GUIDE LEVEL III |
|---|---|---|---|
| VISUAL GUIDE | NO DISPLAY | ← | ← |
| VOICE GUIDE | TURN XX, IN300M. CRUDE MACHINE VOICE | TURN XX, IN300M. SMOOOTH VOICE | TURN XX, IN300M. NATURAL VOICE |

Fig.11 (a)

LOCATION / CATEGORY

| | | INFORMATION | INFORMATION CLASS | | |
|---|---|---|---|---|---|
| | | | 1 | 2 | 3 |
| P1 | | COORDINATE DATA | O | | |
| | VISUAL DATA | INTERSECTION SHAPE DATA | | O | O |
| | | FACILITY DATA | | | O |
| | | ROAD WIDTH DATA | | | O |
| | | LANE DATA | | | O |
| | | INTERSECTION DESIGNATION DATA | | O | O |
| | VOICE DATA | DISTANCE DATA | O | | |
| | | INTERSECTION DESIGNATION DATA | | O | |
| | | DIRECTION DATA | O | | |
| | | FACILITY DATA | | | O |

Fig.11 (b)

| INFORMATION CLASS | 1 | 2 | 3 |
|---|---|---|---|
| GUIDE LEVEL | I | | |
| | | II | |
| | | | III |

Fig.11 (c)

| | GUIDE LEVEL I | GUIDE LEVEL II | GUIDE LEVEL III |
|---|---|---|---|
| VISUAL GUIDE | NO GUIDE MAP | [map with ○○INTER-SECTION] | [map with ○○INTER-SECTION] |
| VOICE GUIDE | TURN RIGHT, IN 300M. | TURN RIGHT, IN 300M, AT INTERSECTION XX. | TURN RIGHT, IN 300M, NEXT TO XX, AT INTERSECTION YY. |

| TRAVEL SPEED | GUIDE LEVEL |
|---|---|
| n > X | I |
| X ≧ n > Y | II |
| Y ≧ n | III |

X : FIRST THRESHOLD VALUE
Y : SECOND THRESHOLD VALUE
n : TRAVEL SPEED

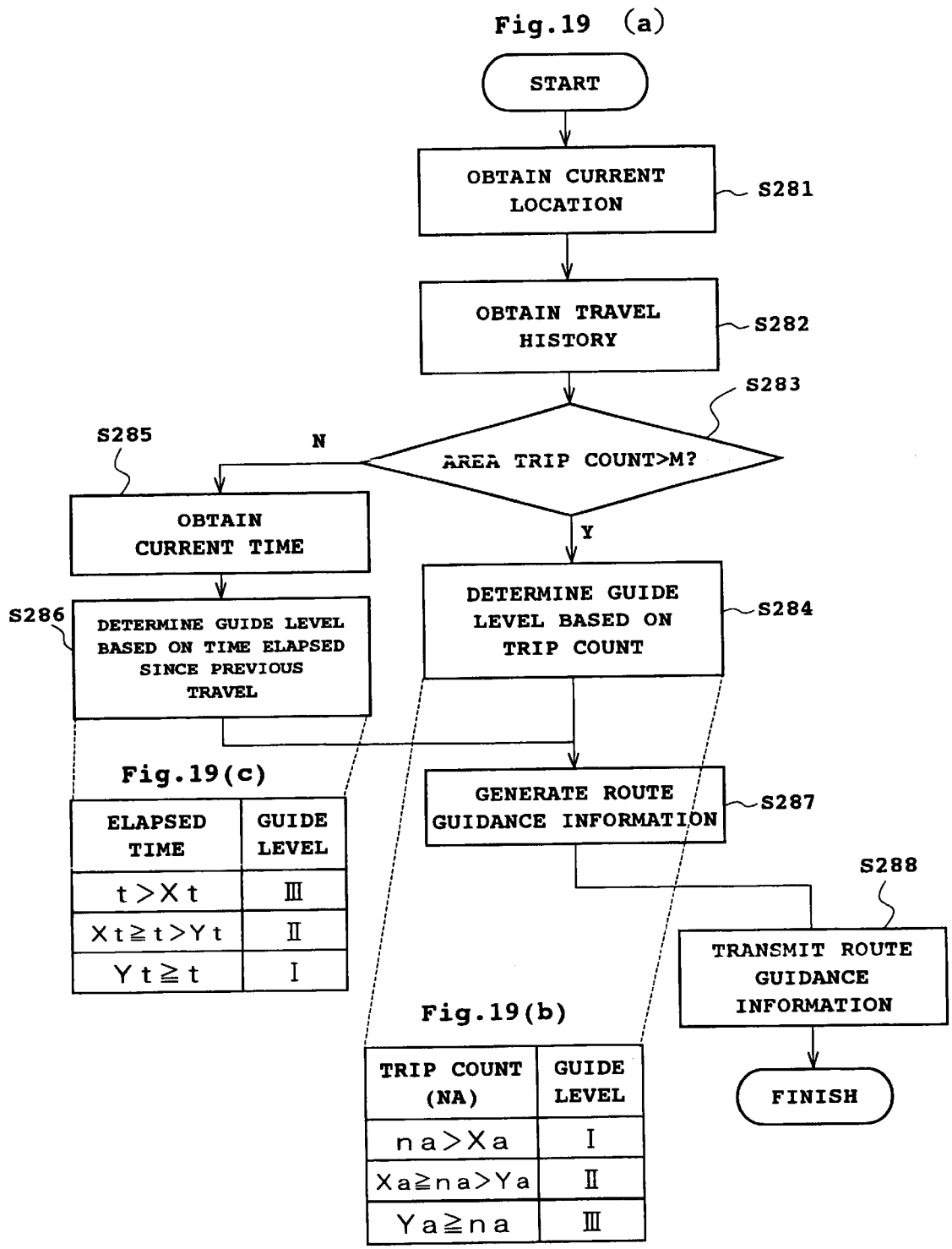

APPARATUS AND SYSTEM FOR PROVIDING ROUTE GUIDANCE INFORMATION AND A COMMUNICATION TERMINAL THEREOF

BACKGROUND OF THE INVENTION

1. Field of the Invention

The present invention relates generally to an apparatus for providing route guidance information and to a communication terminal receiving route guidance information from the apparatus for providing route guidance information. The present invention also relates to a system for providing route guidance information comprising the apparatus for providing route guidance information and the communication terminal.

2. Description of the Related Art

As a system for providing route guidance information to a communication terminal, Japanese Patent Laid-Open Publication No. Hei 9-178499, for example, discloses a route information providing system. In the system disclosed in that publication, route calculation data is sent from an in-vehicle device to an information center and specific route guidance information is sent from the center to the in-vehicle device in batch transfer processing.

In such a system, however, the batch transfer processing for sending route guidance information from the center to the in-vehicle device leads to certain problems. One resulting problem is that there is a possibility that it may become impossible to execute route guidance when a portion of the route guidance information is lost, such as through a communications failure occurring while sending the route guidance information. Another resulting problem is the excessive time and cost required for transmission because data of basically less importance for the communication terminal is transmitted in the batch transfer processing.

SUMMARY OF THE INVENTION

Therefore, it is an object of the present invention to provide executable route guidance, even when a communication failure occurs during transmission of the route guidance information. The object is achieved in the present invention by reorganizing a plurality of practical units of guide information from a route guide information and sequentially sending the practical units of guide information to a communication terminal. Therefore, route guidance can be executed based on that portion of practical units received in the event of a communication failure.

With the present invention, it is possible to send route guidance information data of a reduced size by selecting information according to circumstances. As a result, communication connection time and associated costs can be reduced and reliability of route guidance in the event of a breakdown in communication can be improved.

With the present invention, it is also possible to send route guidance information data of a reduced size by selecting a guidance position where a route is actually instructed as circumstances demand from potential guidance positions which are possible positions where a route is instructed. This leads to reduction of a time and costs of communication and improvement the rate of implementing route guidance at the occurrence of a breakdown of communication as well.

Furthermore, it is possible to send route guidance information of which data size is adjusted by calibrating an effective segment length in this invention. This also leads to a reduction of time and costs of communication and improvement of the rate of implementing route guidance at the occurrence of a breakdown of communication.

In the present invention, it is also possible to send route guidance information of which data size is adjusted by selecting a data format in which information is structured with appropriate size when a plurality of data formats are applicable to an information element. This results in improving the rate of implementing route guidance at the occurrence of a breakdown of communication.

BRIEF DESCRIPTION OF THE DRAWINGS

FIG. 3 is an explanatory view showing an example of an information class setting table in accordance with the first embodiment of the present invention;

FIG. 5(a), FIG. 5(b) and FIG. 5(c) show example settings for information class and guide level, and an example of route guidance in accordance with the first embodiment of the present invention;

FIG. 7(a), FIG. 7(b), FIG. 7(c) and FIG. 7(d) are flowcharts and tables outlining an example process for generating guide information data blocks in accordance with the first embodiment of the present invention;

FIG. 9(a), FIG. 9(b) and FIG. 9(c) are explanatory views showing example settings for information class and guide level, and an example guide route based on this guide information in accordance with the first embodiment of the present invention;

FIG. 11(a), FIG. 11(b) and FIG. 11(c) are explanatory views showing examples of structural outlines of route guidance information and route guidance based on this structural outline in accordance with the second embodiment of the present invention;

FIG. 19(a), FIG. 19(b) and FIG. 19(c) are explanatory views outlining an example process for generating route guidance information and an example of a determined guide level in accordance with the second embodiment of the present invention;

DESCRIPTION OF THE PREFERRED EMBODIMENTS

The entire disclosure of Japanese application No. 2000-305992 filed on Oct. 5, 2000 including specification, claims, drawings and summary are incorporated herein be reference in its entirety.

Figure 1:
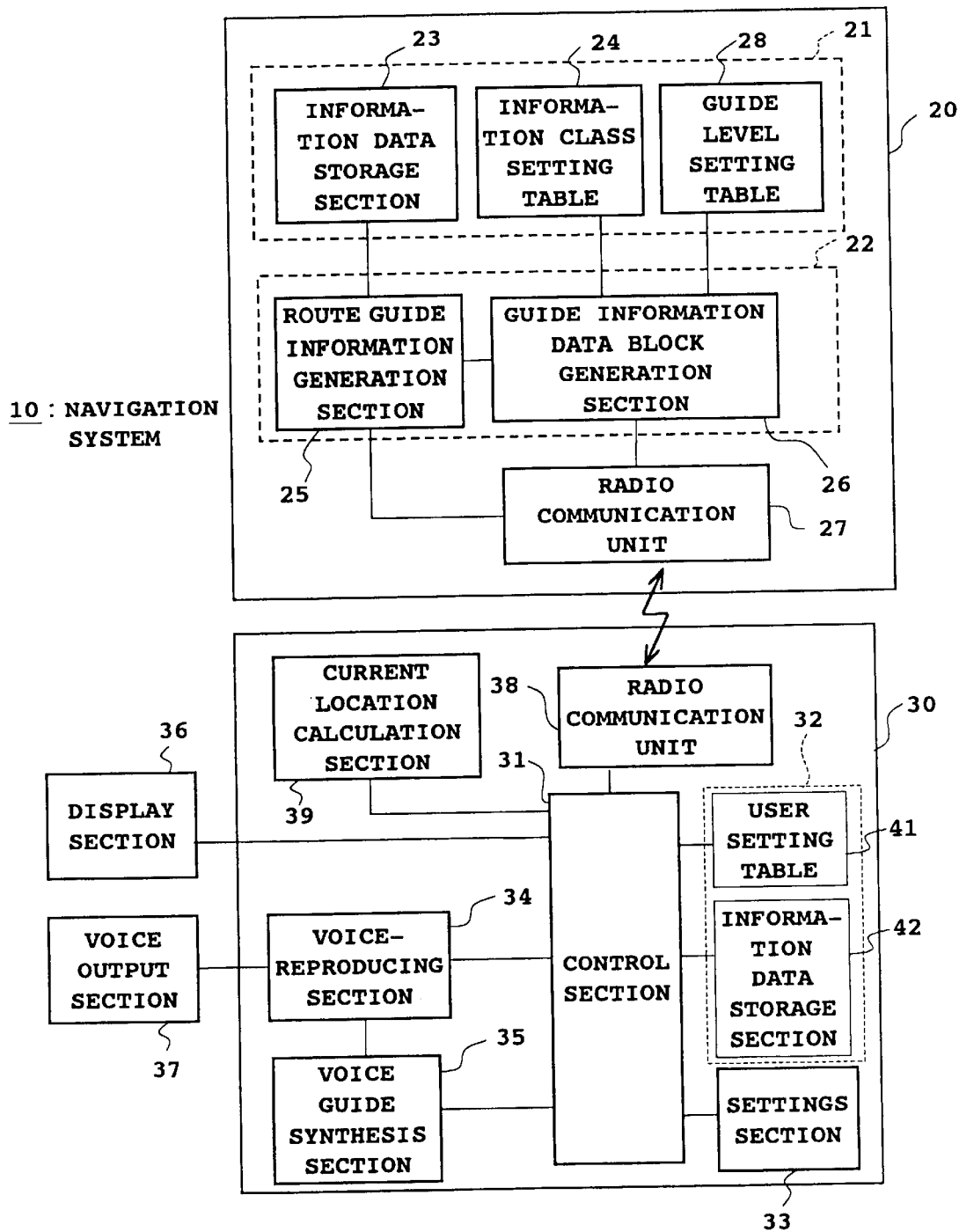
FIG. 1 is a block diagram showing schematic configuration of an automobile navigation system in accordance with a first embodiment of the present invention.
Figure 2:
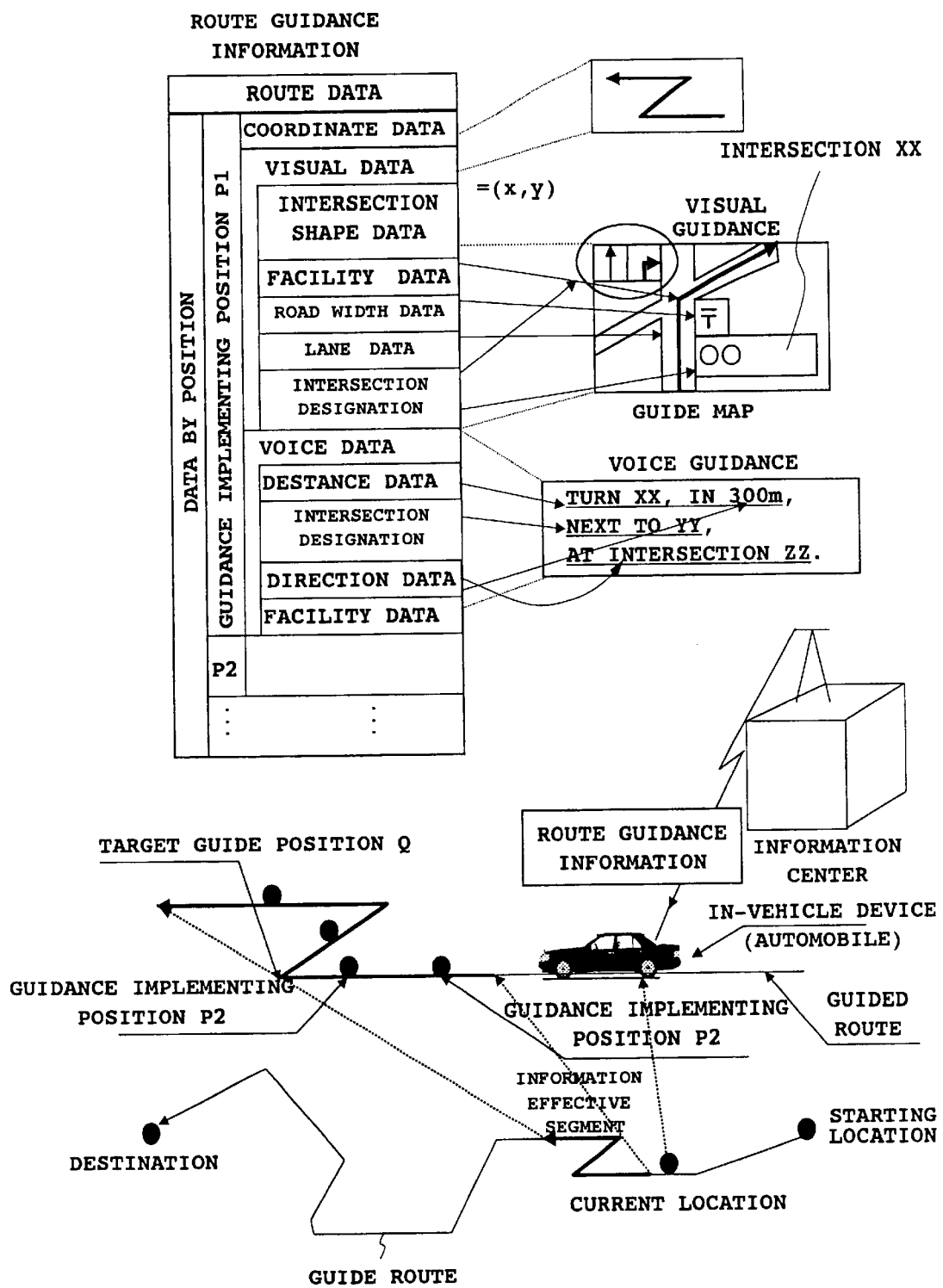
FIG. 2 is an explanatory view showing an example of a structural outline of route guidance information according to the present invention.

A first preferred embodiment, wherein a system for providing route guidance information of the present invention is applied to an automobile navigation system, will be described in detail with reference to the accompanying drawings and through use of illustrative examples. A block diagram showing schematic configuration of automobile navigation system in accordance with the first embodiment is shown in FIG. 1. An example structural outline of route guidance information is shown in FIG. 2 and an example information class setting table is shown in FIG. 3.

The figures show an automobile navigation system 10 comprising an apparatus for providing route guidance information, for example, an information center 20, and a communication terminal, for example, in vehicle device 30. The information center 20 comprises a storage section 21, control section 22, and a communication means, such as a radio communication unit 27. The storage section 21 in turn comprises an information data storage section 23 in which various types of information including map information is stored, information class setting table 24 in which an information class is set to each information element, and guide level setting table 28 for setting information elements to be included in units of guide information to be sent. The control section 22 also comprises a route guide information generation section which creates a route guide information through retrieving a plurality of information elements to be stored in the information data storage section 23, and a guide information data block generation section 26 which creates a plurality of guide information data units including at least one information element from the route guide information through reorganizing the route guide information.

Guide information data block generation section 26 establishes information class and guide level through referencing to the information class setting table 24 and guide level setting table 28 and creates guide information data blocks as route guidance information. The radio communication unit 27 carries out communication with a radio communication unit 38 installed in the in-vehicle device 30. Various information including, for example, route guidance information transmitted from the information center 20 to the in-vehicle device 30 or a route guidance request from the in-vehicle device to the information center 20, are passed through the communication.

Referring to the in vehicle device 30, a control section 31, user setting table 41, storage section 32 including an information data storage section 42, settings section 33, current location calculation section 39, display section 36, voice reproducing section 34, voice output section 37, voice guide synthesis part 35, and the radio communication unit 38 are comprised in the in-vehicle device 30. The control section 31 controls each part of the in-vehicle device 30. Various types of information, for example, information class or guide levels for each user are set to the user setting table 41 and stored in the information data storage section 42. Parameters of various types (for example, information class or guide level of the user setting table 41) are set to or changed in the settings section 33. The current location of the in vehicle device 30 is computed at the current location calculation section 39. This display section 36 shows visual guide with graphics or character strings. The voice reproducing section 34 replays voice guide, which are spoken from the voice output section 37. The voice guide synthesis part 35 synthesizes the voice guide from voice guide information configured in two or more data formats. The radio communication unit 38 transmits information of various types between the radio communication unit 27 of the information center 20 and a telephony communication center (not illustrated). And the control section 31 is capable of being set to guide level or information class.

The configuration of route guidance information is discussed below with reference to FIG. 2. The information center 20 provides route guidance information corresponding to each information effective segment to the in-vehicle device 30. The route guidance information includes guided route data and data by position at each navigation implementation position. The guided route data includes coordinates or shapes of the guided route or the like, and the data by position is classified into two or more categories (e.g. coordinate data, visual data, and voice data). The coordinate data represents the coordinates of guidance position (such as latitude and longitude of the position). The visual data consists of a plurality of information elements wherein, in this embodiment, shape data of intersections, facility data, road width data, lane guide data, and designation data of intersections are established. The voice data also consists of a plurality of information elements wherein, for example, distance data representing the distance from the current position to the guidance position, designation data of intersections, direction data indicating guided direction at the guidance position, and facility data are established.

Referring now to the information setting table 24 and the guide level setting table 28 in FIG. 3, describe the information class and the guide level. Depicting the information at first, the information class is set by an information element having possibility of being inserted into the route guidance information. For example, each of the information elements is set in the table 24 depicted in FIG. 3 as follows. The coordinate data is specified at information class 1, the shape data of intersections is specified at information class 2 and 3. The information class is determined according to the priority for sending route guidance information, the size of the route guidance information, or the like.

Then, guide information data blocks corresponding to the guide level are generated based on guide level settings as they relate to information class established by guide information data block generation section 26. The guide level is used as an indicator for sending the route guidance information. In this embodiment, the guide information data blocks are generated by an information class basis and sent in order according to the guide level. In addition, the information class specified in the information class setting table 24 or the guide level specified in the guide level setting table 28 is decided at every target guide position Q (a target position of guide the guidance position). User settings for the information class or guide level are stored in the user setting table 41 installed in the in-vehicle device 30 in a particular format, which is, in the present example, the same format as those tables 24 and 28.

Generation and transmission of the guide information data blocks as route guidance information are described hereinafter. The route guide information generation section 25 retrieves information elements for the next segment of a specific length determined effective for guidance (effective segment length) from the information data storage section 23 at predetermined intervals and generates route guide information. Then, guide information data block generation section 26 determines the information class and guide level according to circumstances by referring to the information class setting table 24, guide level setting table 28, or user setting table 41, and, based on the determined settings, reorganizes the guide information data blocks, for example, to create a one to one correspondence between the information class and the guide level. The guide information data blocks generated through reorganization are sequentially transmitted from the radio communication unit 27 to the in-vehicle device 30. At this time, the guide information data blocks are sent, for example, in order of guide level.

In route guidance in the in-vehicle device 30, when route guidance information is received at the radio communication unit 38, the control section 31 proceeds as follows. When the received route guidance information contains visual data, in other words, information elements for visual guidance, the control section 31 may cause the display section 36 to show the information at a specified timing. When the received route guidance information contains voice data, in other words, information elements for voice guidance, the control section 31 forces the voice reproducing section 34 to replay the information so that it is spoken by the voice output section 37 at a specified timing. When the route guidance information includes, for example, distance data "300 m ahead" and direction data "turn left", oral instructions or route guidance stating "turn left in 300 m" is synthesized by the voice-reproducing section 34. The oral route guidance is synthesized in order of distance data, facility data, designation data of intersections and direction data. When information expressing instructional substance and information for voice synthesis are included as voice data, the control section 31 synthesizes them at voice guide synthesis section 35 and replays them at the voice-reproducing section 34. Although the control section 31 failed to receive one of the guide information data blocks in the format available for replay because of a breakdown of communication or received in not-reproducible formats, it is possible to execute route guidance by using another block of guide information for the same information effective segment, that is, a guide information data block of a different level. Certain example modifications of the device according to this embodiment are described below.

EXAMPLE 1.1

Figure 4:
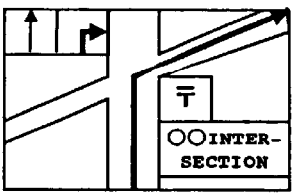
FIG. 4(a), FIG. 4(b) and FIG. 4(c) show example settings for information class and guide level, and an example of route guidance based on these settings in accordance with the first embodiment of the present invention.

Sending Guide Information Data Blocks Including Voice Data Prior to that Including Visual Data, Generating Guide Information Data Blocks by a Guide Form FIG. 4(a), FIG. 4(b) and FIG. 4(c) show settings for information class and guide level, and route guidance based on each of the guide information data blocks in accordance with Example 1.1. In the present example, the information class is identical in the same category. In addition, coordinate data is set at information class 1, each of the information elements of visual data is set at information class 2, and each of the information elements of voice data is set at information class 1. Guide information data block generation section 26 sets up the information class and guide level as shown in FIG. 4(a) and FIG. 4(b). The guide information data blocks at the guide level I including the coordinate data and voice data at the information class 1, and the guide information data blocks at the guide level II including visual data at the information class 2 are generated based on these settings. These guide information data blocks are transmitted through the radio communication unit 27, the operation of which is controlled by the control section 22. The transmission is executed in ascending order of guide level or, to be more specific, the guide information data including voice data (at the guide level I) is sent prior to the guide information data including visual data (at the guide level II). oral route guidance based on the voice data at the guidance position becomes executable as soon as the guide information data including voice data is received in the in-vehicle device 30 (see FIG. 4(c)). As a result, route guidance can be executed, even when next reception or replay of the guide information data including display data becomes impaired as a result of communication conditions after acquisition of the guide information data blocks including voice data (at the guide level I). Voice data is usually lighter and can therefore be received in a shorter time than heavier visual data. Thus, initially sending the guide information data blocks including information elements of which data size is small leads to early achievement of possible conditions to implement route guidance. Generating different and separate guide forms of voice and view means that route guidance is executable by using guide information data which can be presented in either form. It is therefore possible to implement route guidance using guide information including information elements of either guide form when data transmission is interrupted due to a breakdown in communication or the like. When a practical entity of guide information in either form is received, both voice and visual representations (voice guide and visual guide) are executed as route guidance as shown FIG. 4(c).

EXAMPLE 1.2
Subdividing Information Class by an Information Element

FIG. 5(a), FIG. 5(b) and FIG. 5(c) show example information class and guide level settings, and route guidance based on these settings. In this Example 1.2, the information class is subdivided as shown in FIG. 5(a). The guide level is established so as to set a one-to-one correspondence with the information class. Therefore, the guide information data blocks at guide level I include information elements at information class 1 or, to be more specific, include distance data and direction data in a voice data category and coordinate data. Only voice guidance is executed through the guide information data blocks at guide level I as shown FIG. 5(c). The guide information data for guide level II contains shape data and designation data of intersections in a visual data category, and designation data of intersections in the voice data category. Through this guide information data are generated visual guidance showing simple shape and designation of intersections, and more specific voice guidance wherein the designation data of intersections are added to the guide information data at guide level I, which was previously received and stored in the storage section 32. In addition, still more specific route guidance in the form of both voice and visual representations is generated based on the guide information data blocks at guide level III. In this case, for example, route guidance in complete form containing all information elements is implemented. Thus, the information class is set on an information element basis and guide information data blocks are subdivided into a greater number of blocks or units in this embodiment. This makes it possible to effectively prevent disruption of route guidance due to communication problems. Furthermore, configuring the initial guide information data blocks with the minimum information needed to execute route guidance, as described in this example, decreases the transmission time for the guide information data blocks. This also helps to achieve a state such that some form of route guidance becomes executable as soon as possible. Where voice data is concerned, it is preferable to include operation direct data (direction data) and at least minimal data allowing the target guide position to be identified (e.g. distance data).

Figure 6:
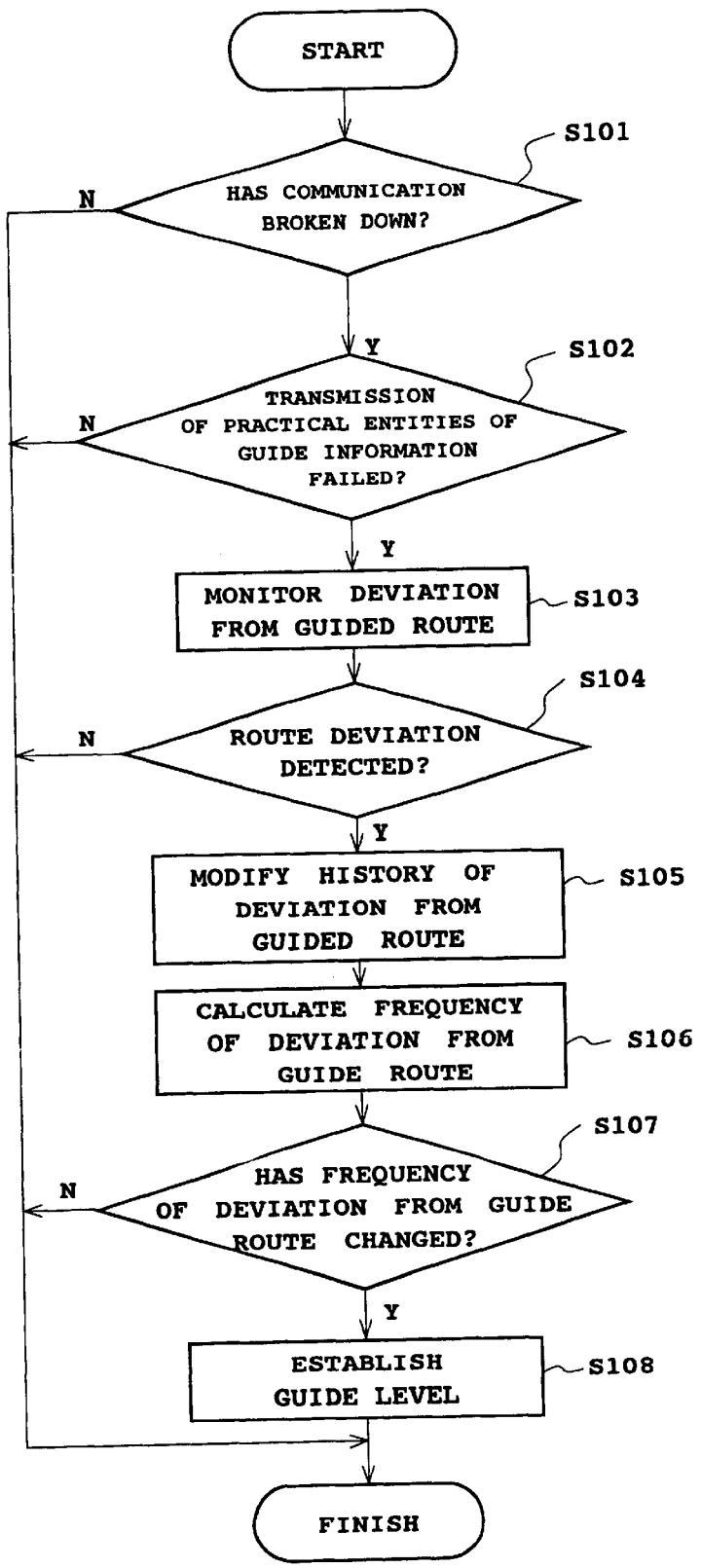
FIG. 6 is a flowchart outlining an example process for generating guide information data blocks in accordance with the first embodiment of the present invention.

EXAMPLE 1.3
Guide Information Data Block Generation Based on Conditions of Deviation from Route FIG. 6 is a flowchart outlining a process for generating guide information data blocks in accordance with an example 1.3. The control section 31 in the in-vehicle device 30 monitors, for example, the occurrence of a breakdown in communication during transmission of route guidance information (S101). When some of the guide information data is not received because of such a communications failure (S102), the control section 31 determines whether or not a route deviation has occured (S104) by monitoring conditions of deviation from route (S103) for the transmitted guide information data. When a deviation from the set route has been found, the control section 31 modifies a history of deviation from navigated route stored in the storage section 32 (S105), and then calculates the frequency of occurrence of deviation from route by referring to this history (S106). Next, the control section 31 checks for a change in the frequency (S107). When a change in the frequency is detected, the control section 31 sets up the guide level and information class in, for example, the user setting table 41 (S108). When the frequency of deviation from route increases only when navigation is implemented using the initially transmitted guide information data blocks, it is determined that the information provides insufficient guidance for the user. Responding to this, the guide level or information class is modified so as to increase the amount of information included in the guide information data blocks. As a result, it becomes possible to generate guide information data allowing route guidance to be implemented with more reliability.

EXAMPLE 1.4
Guide Information Data Block Generation Based on Communication Conditions of a Communication Means or a Utilization History of a Radio Communication Unit FIG. 7(a) is a flowchart outlining a process to generate guide information data blocks based on communication conditions in accordance with an example 1.4. Guide information data block generation section 26 monitors communication conditions of the radio communication unit 27 or 38 in order to obtain information of the conditions (S121), sets the guide level according to the information of the conditions (S122), generates guide information data blocks based on the guide level (S123), and sends these data blocks (S124). To more specifically describe the setting of the guide level in the process at S122, guide information data block generation section 26 works as follows. For example, in a case where communication is under favorable conditions with fewer occurrences of breakdown, guide level I is established so as to include a plurality of information class 1 and 2 as shown in FIG. 7(c) in order to include more information in the guide information data blocks having higher priority of transmission. In a contrasting case, where communication is under adverse conditions with frequent breakdowns, there is a greater need to make navigation executable even communications have broken down. In this case, the guide level is establishes so as to have one-to-one correspondence with information class as shown in FIG. 7(d) in order to include a minimum of information in the guide information data blocks having higher priority of transmission. This better ensures that route guidance can still be provided, even when communications fail. Although adjustment of the guide level is described above, the information class may be adjusted instead, or in addition to, the guide level.

It is also possible to infer the communication conditions from the utilization history of the radio communication unit. FIG. 7(b) is a flowchart outlining a process for generating guide information data blocks based on the utilization history of the radio communication unit in example 1.4. The control section 22 monitors a utilization status of communication at the radio communication unit 27 or 38 and updates the utilization history of the radio communication unit stored in the storage section 21. Guide information data block generation section 26 retrieves the utilization history of the radio communication part when generating guide information data blocks (S131), and calculates utilization frequency of the radio communication part at a current time period through an inference from the history (S132). The guide information data block generation section 26 then sets the guide level in consideration of the calculated utilization frequency (S133), generates guide information data blocks according to the setting (S134), and transmits these data blocks (S135). To more specifically describe the setting of the guide level in the process of S133, guide information data block generation section 26 using an example case wherein the utilization frequency of the radio communication part is low during a time period of sending guide information data blocks, it is inferred in such a case that communication conditions are favorable and that the likelihood of a communications failure is less. Therefore, a plurality of information classs 1 and 2 are set to the guide level I as shown in FIG. 7(c) in order to provide more information in the guide information data blocks having higher priority of transmission. In a contrasting case wherein the utilization frequency of the radio communication unit is high during a time period of sending guide information data blocks, it is inferred that there is a greater chance that communication may fail, and it is therefore necessary to secure information needed for minimum route guidance as soon as possible by decreasing information elements in the guide information data blocks having higher priority of transmission. In such a case, guide level is set to have one-to-one correspondence with the information class as shown in FIG. 7(d). Thus, it becomes possible to increase the reliability of route guidance by inferring the communications conditions from the utilization history of the radio communication part.

EXAMPLE 1.5
Route Guidance in Non-communication Area

Figure 8:
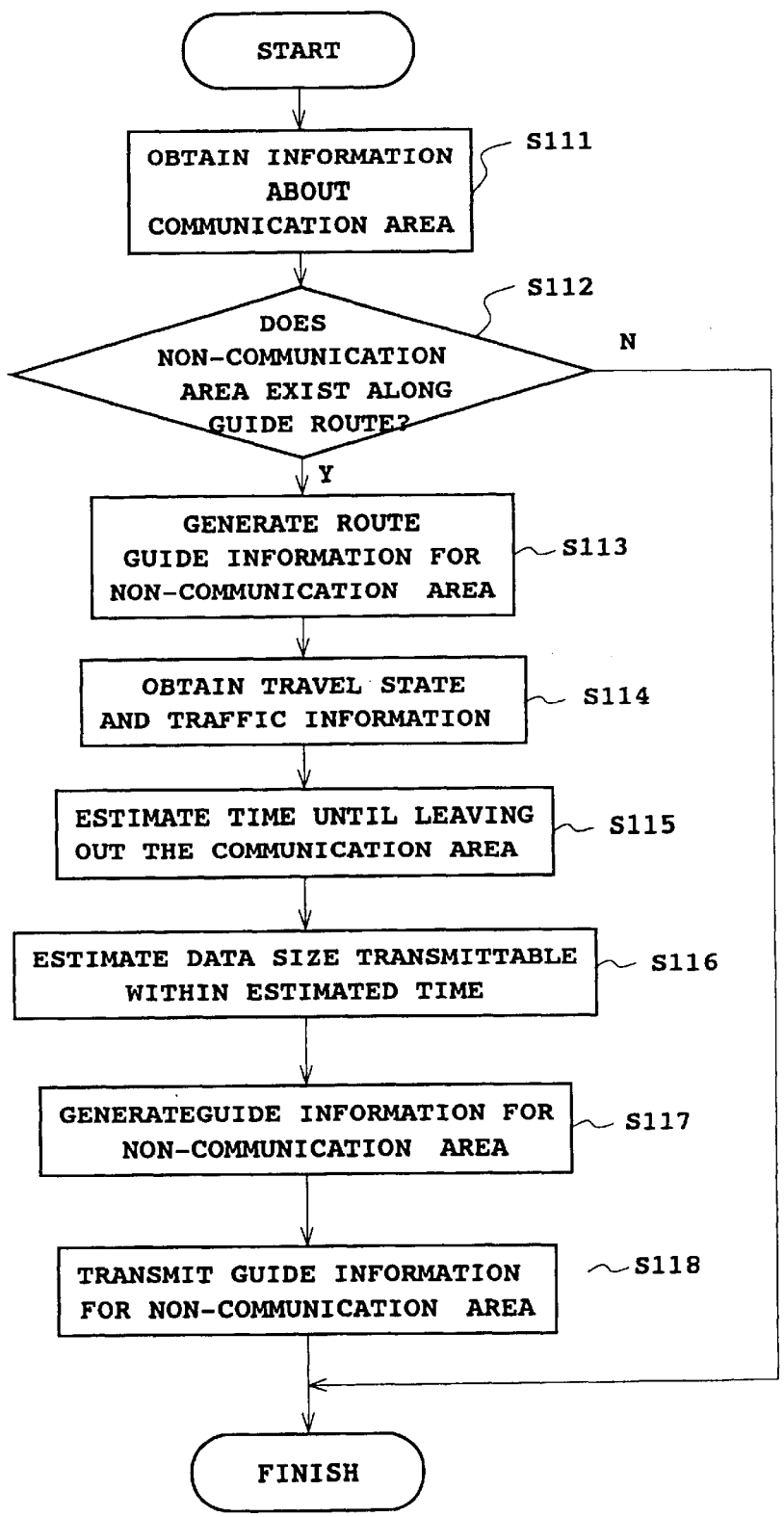
FIG. 8 is a flowchart outlining an example process for generating guide information data blocks in accordance with the first embodiment of the present invention.

Example 1.5 will show how it is possible to implement route guidance even when an area where communication is not possible exists on an expected travel route (guided route). FIG. 8 is a flowchart outlining a process to generate guide information data blocks in accordance with this embodiment. Guide information data block generation section 26 first obtains communication area information (S111), discriminates between a communication area and a non-communication area, and then compares the communication area information with the guided route to search for any non-communication areas on the guided route (S112). When a non-communication area is located on the guided route, guide information data block generation section 26 generates route guide information using information elements for a guide segment within the non communication area (S113). Guide information data block generation section 26 determines the travel state of the in-vehicle device 30 and information about traffic conditions of guided route on the expected travel route (S114) and estimates time elapsed from the present to a time when the in-vehicle device 30 will leave the communication area (S115). The travel state data of the in-vehicle device 30 includes a current location, travel speed, and travel history until the current time. The information about traffic conditions includes information on a potential point or area where the passage of vehicles is effected by traffic conditions, construction, or the like. Next, guide information data block generation section 26 estimates the amount of guide information data transmittable in the time before the vehicle will leave the communication area (S116), and generates guide information data blocks corresponding to the non-communication area with respect to the data size (S117). To be more specific, data generation is completed by totaling the data size of information elements for an information class and determining the guide level according to the result. When the combined size of information elements at information class is smaller than the amount of transmittable data as estimated earlier and the data size of the information elements at information class 1 and 2 is larger than the transmittable data size, the guide information data blocks should be generated as a set of the information elements at information class 1. That is, guide information data block generation section 26 generates guide information data blocks by setting guide level I to information class 1, and then sends the generated level I guide information data blocks (S118) at a specified timing. Accordingly, the guide information data blocks corresponding to the guided route in the non-communication area can be transmitted before the vehicle enters the non communication area in which communication will not be possible, thereby enabling navigation in the non-communication area. In addition, because the guide information data blocks at a different level (for example, at a higher level), allowing more specific route guidance to be executed, are transmitted in succession according to this embodiment, it becomes possible to execute more specific route guidance when communication remains impossible longer than estimated.

EXAMPLE 1.6
Generation of Guide Information Data Blocks Containing Data of Multiple Formats FIG. 9(a), FIG. 9(b) and FIG. 9(c) show settings for information class and guide level, and navigation routes based on each of the guide information data blocks in accordance with an example 1.6. Information class is set against data formats varying in one of the information elements as shown in FIG. 9(a) (see distance data and direction data in voice data). For the distance data of voice, text data representing contents of distance data is designated at information class 1, a set of text data and voice-synthesizing data used for controlling voice synthesis from text data in order to synthesize more fluently spoken voice is designated at information class 2, and waveform data containing a voice waveform itself is designated at information class 3. Guide level is set so as to have one-to-one relationship with information class as shown in FIG. 9(b). Using the guide information data blocks generated with these settings, only voice guidance is implemented, as shown in FIG. 9(c). To be more specific, voice guidance using the guide information data blocks at guide level 1 is output as an unnatural or machine-like voice, using the guide information data blocks at level II is output with a smoother voice, and using the guide information data blocks at guide level III comes out in a form close to natural human speech. The setting of information class and guide level for these data formats are determined on the basis of data size of information to be transmitted. Information in the data format with the smallest data size is sent in the guide information data blocks initially transmitted in order to reduce the time necessary for communication of the guide information data blocks so that some form of navigation can be executed as soon as possible.

Figure 10:
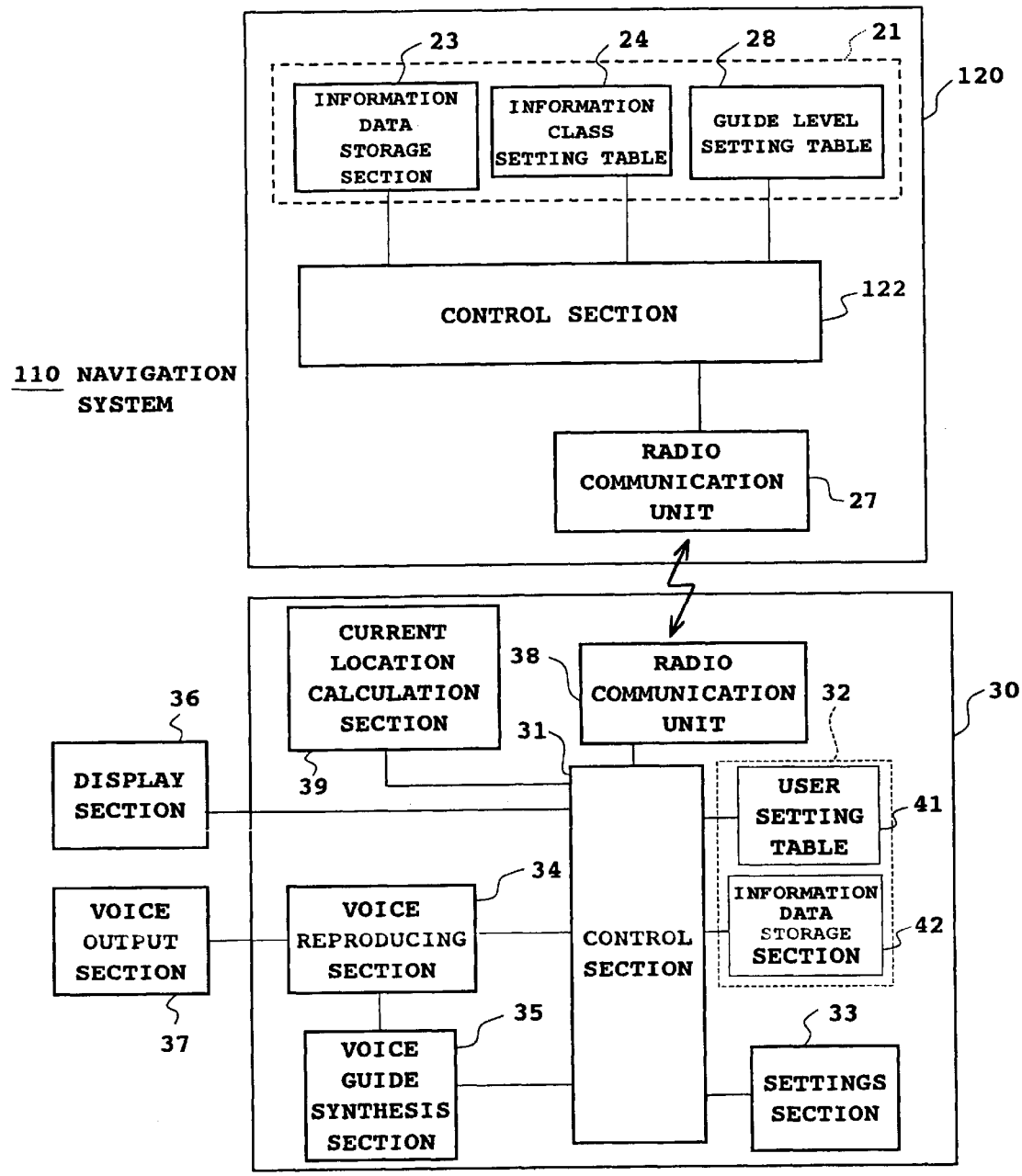
FIG. 10 is a block diagram of automobile navigation system in accordance with a second embodiment of this invention.

A second preferred embodiment of the present invention will next be described below with reference to the accompanying drawings and through use of illustrative examples. In the examples used to illustrate the second embodiment, a system for providing route guidance information of the present invention is applied to an automobile navigation system. FIG. 10 shows a block diagram of an automobile navigation system in accordance with this embodiment, while FIG. 11(a), FIG. 11(b) and FIG. 11(c) show structural outlines of route guidance information and a navigation example based on the structural outline.

The structural outline of an automobile navigation system 110 will be explained first. The automobile navigation system 110 comprises an apparatus for providing route guidance information, for example, an information center 120 and a communication terminal, for example, an in-vehicle device 30. Explanation of the structure of the in-vehicle device 30 will not be repeated here as the configuration is the same as that of the in-vehicle device 30 of the first embodiment described in detail above. The information center 120 comprises a storage section 21, a control section 122, and a communication means, for example, a radio communication unit 27. The configurations of these parts except the control section 122 are equivalent to those of said first embodiment. The control section 122 determines information class and guide level by referring to an information class setting table 24, a guide level setting table 28, or a user setting table 41. Then, the control section 122 extracts information corresponding to an effective segment length at a specified timing, which is stored in an information data storage section 23, and generates route guidance information.

Referring now to generation and transmission of the route guidance information in this embodiment, the control section 122 or the control section 31 determines information class and guide level according to various conditions while referring to the information class setting table 24, the guide level setting table 28, or the user setting table 41. Then, the control section 122 or 31 retrieves information elements corresponding to a specified effective segment length at a specified timing based on said information class or guide level and generates route guidance information. In the first embodiment described above, the information contained in the route guide information is reorganized into a number of guide information data blocks, but the data itself is unchanged. These guide information data blocks are then transmitted at specified intervals or timing. However, in this second embodiment, guide information data blocks are generated by selecting the information according to conditions so that the amount of data can itself be reduced.

Referring to FIG. 11(a), FIG. 11(b) and FIG. 11(c), examples of guide level setting against information class will next be described. The information class is set for each of the information elements as shown in FIG. 11(a), just as was the case with the first embodiment. The guide level is established in such a manner that each guide level corresponds with at least one information class as shown in FIG. 11(b), and such that the lower the guide level, the less information is included in the route guidance information. Guide level I is allocated to information class 1, guide level II is allocated to information class 1 and 2, and guide level III is allocated to information class 1, 2, and 3 in this example. The route guidance information is created corresponding to a single guide level. Accordingly, when in this example guide level is determined to be I in the control section 122 shown in FIG. 11(a), FIG. 11(b) and FIG. 11(c), the route guidance information comprises information elements at information class 1, that is, coordinate data, distance data of voice, and direction data of voice, and route guidance based on this route guidance information is output without visual guidance, but as voice guidance of "turn right in 300 m" which is synthesized from distance data "300 m ahead" and direction data "turn right". Modifications of this embodiment will be discussed below.

EXAMPLE 2.1
Selection Based on Road Type

Figure 12:
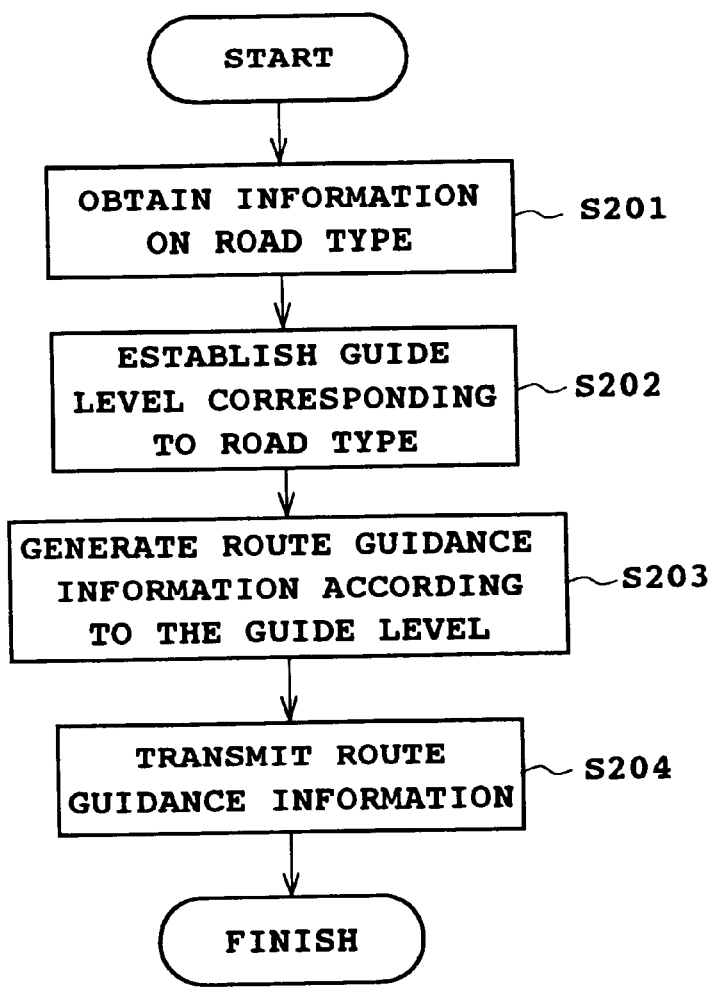
FIG. 12(a) and FIG. 12(b) are a flowchart and a table outlining an example process for generating route guidance information in accordance with the second embodiment of the present invention.

The control section 122 is capable of selecting information according to road type. FIG. 12(a) is a flowchart outlining a process to generate route guidance information in accordance with example 2.1. The control section 122 first obtains information on the type of road on which the in-vehicle device 30 is traveling (S201), and then determines guide level corresponding to that road type (S202). Next, the control section 122 generates (S203) and transmits (S204) route guidance information according to the established guide level. An example setting of guide level related to a road type is depicted in FIG. 12(b). In this example, all roads are classified as limited access expressways, highways to which access is restricted to certain types of vehicles or certain minimum speed limits, or streets, which includes all other roads such as city streets or ordinary connecting roads. Limited access roads such as expressways and highways are established at guide level I and streets are established at guide level II. Simpler navigation with less information is executed through the lower guide level. When traveling on an expressway or highway, the possibility of deviating from the guided route, once established, is low. Route guidance is normally not even required when passing a service area or interchange specified as a target guide position. Therefore, including less information in route guidance information for limited access roads where exits are limited successfully contributes to reducing the time and cost required for sending and receiving route guidance information, without adversely affecting route guidance.

EXAMPLE 2.2
Selection Based on Travel Speed

Figure 13:
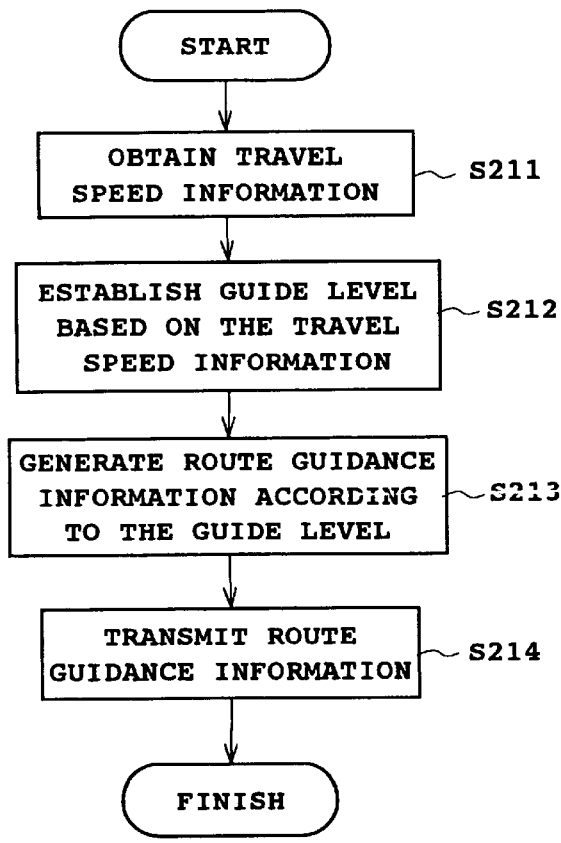
FIG. 13(a) and FIG. 13(b) area flowchart and a table outlining an example process for generating route guidance route guidance information in accordance with the second embodiment of the present invention.

The control section 122 may select information to be included in route guidance information based on a travel speed. FIG. 13(a) is a flowchart outlining an example of such a process. The control section 122 first determines the speed at which the vehicle in which the in-vehicle device 30 is installed is traveling (S211). Then, the control section 122 determines a guide level based on this travel speed (S212), generates route guidance information (S213), and sends this information to the in-vehicle device 30 (S214). An example setting of guide level by a travel speed is shown in FIG. 13(b). In this example, as vehicle speed increases, guide levels are set lower and the density of information to be included in the route guidance information is decreased. A vehicle traveling at high speed, including the case of traveling on an expressway as in example 2.1, is less likely to require detailed route guidance because a vehicle traveling at a high speed is likely traveling along a straight road. Sufficient navigation can be implemented with minimum waste.

EXAMPLE 2.3
Selection Based on Frequency of Deviation from Route

Figure 14:
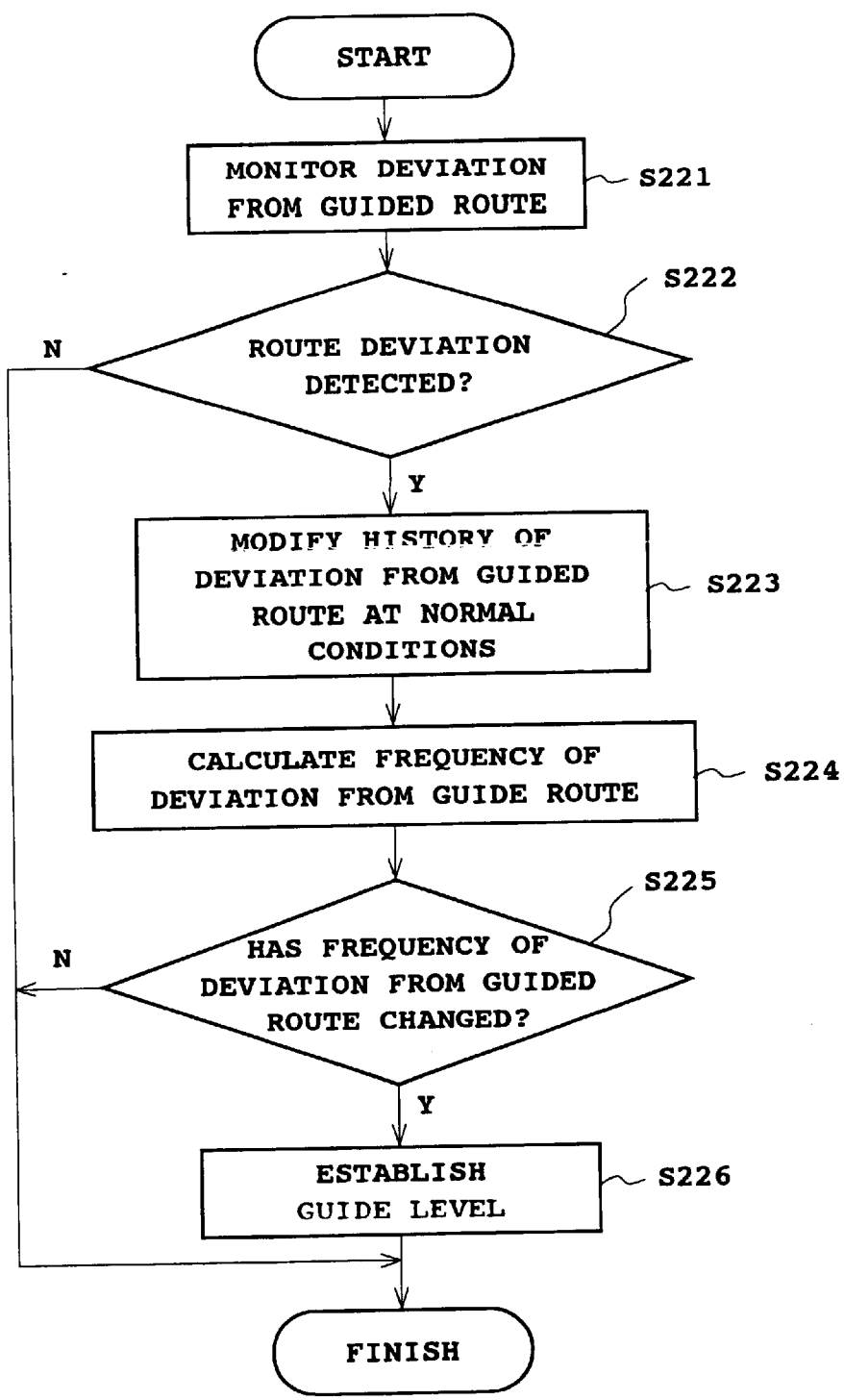
FIG. 14 is a flowchart outlining an example process for generating route guidance information in accordance with the second embodiment of the present invention.

FIG. 14 is a flowchart outlining a process for generating guidance information in accordance with example 2.3. The control section 31 monitors vehicle deviation from the route detailed by the transmitted route guidance information (S221) and verifies any deviation from the planned route (S222). If deviation is found, the control section 31 modifies a history of deviation from the route at normal conditions stored in the storage section 32 (S223). The control section 31 then calculates a frequency of deviation from the route (S224) and notes any changes in the frequency (S225). When a change in the frequency is detected, the control section 31 establishes, for example, a guide level or information class in the user setting table 41 (S226). For example, if the frequency of deviation from a route increases, the control section 31 determines that the information being sent is not sufficient for guidance and selects the guide level so as to increase the amount of information to be included in route guidance information. This makes it possible to avoid wasted time and cost while still generating route guidance information capable of reliable navigation.

EXAMPLE 2.4
Selection Based on Storage Capacity of In-vehicle Device

Figure 15:
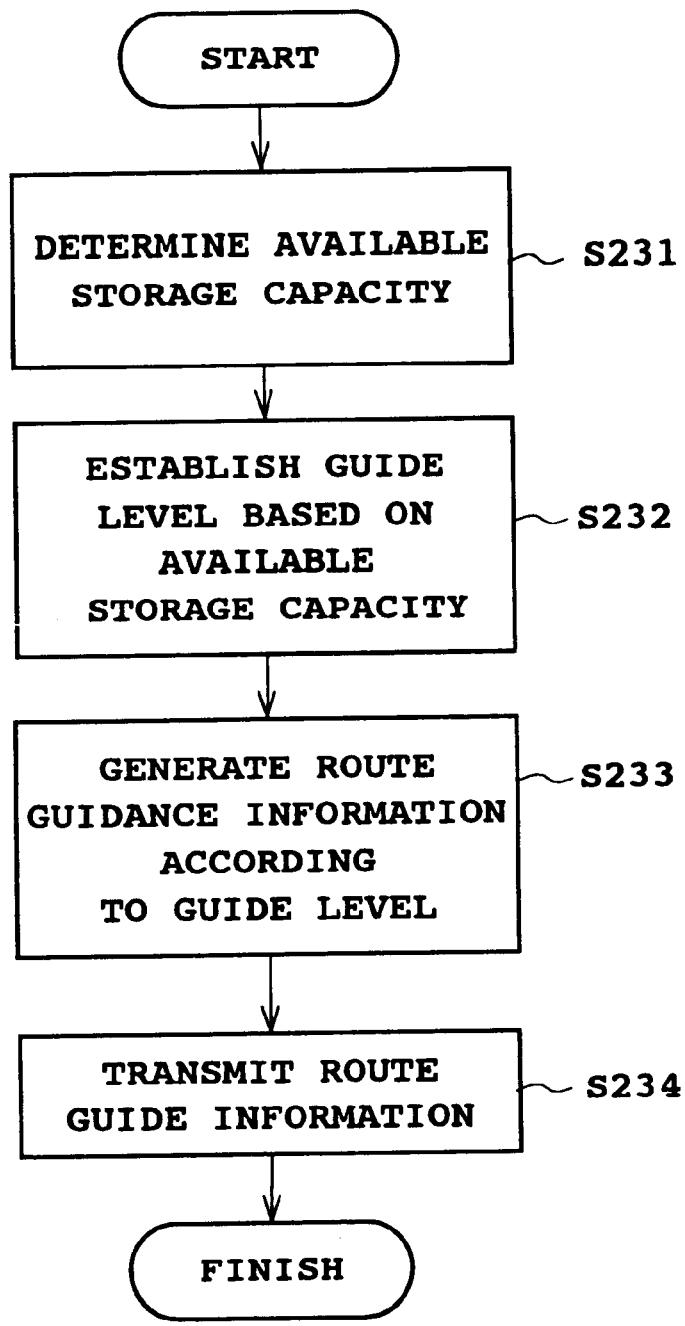
FIG. 15 is a flowchart outlining an example process for generating route guidance information in accordance with an embodiment 2.4.

FIG. 15 is a flowchart outlining a process to generate route guidance information in accordance with an example 2.4. The control section 31 obtains information of the available storage space in the storage section 32 of the in-vehicle device 30 (S231), and determines guide level according to the available storage space (S232). To be more specific, the data size of information per guide level is calculated and the result is compared with the available storage space, similar as was the case in example 1.5 described above. The guide level is determined according to the results of comparison. Wasteful transmission of information which exceeds the storage capacity is avoided, thereby reducing wasted time and transmission costs.

EXAMPLE 2.5

Response to Telephone Communication

Figure 16:
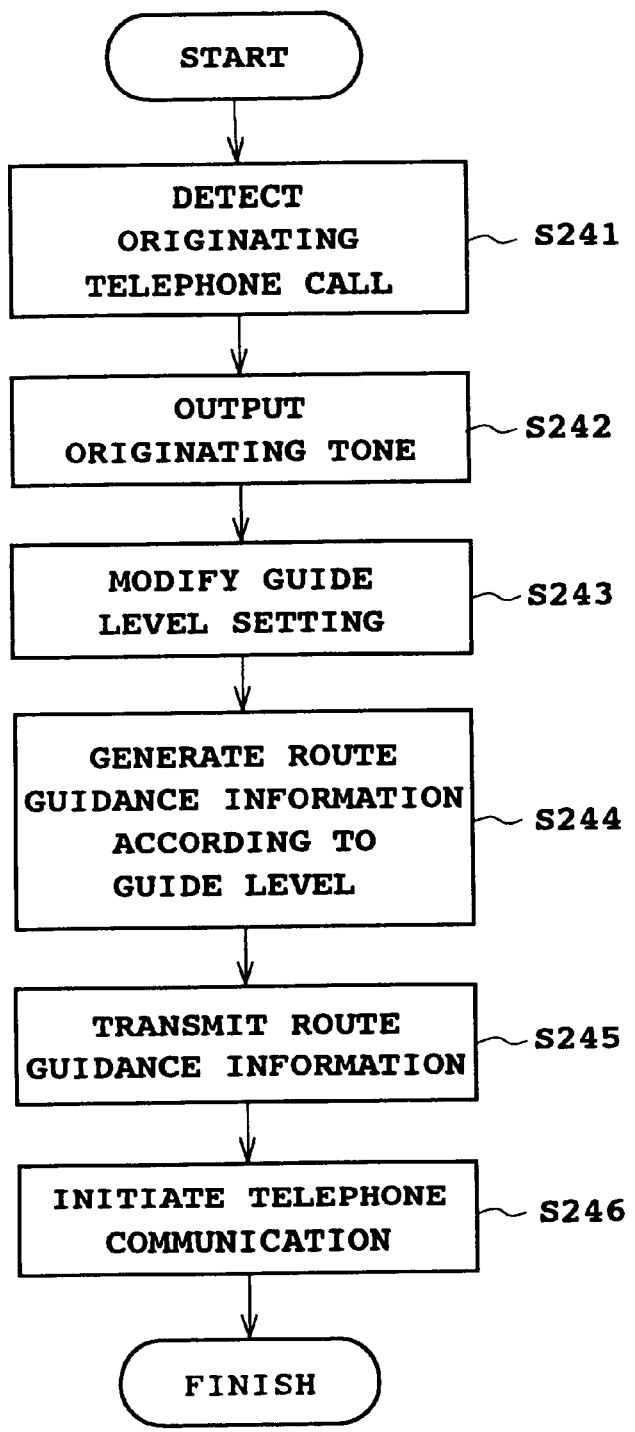
FIG. 16 is a flowchart outlining an example process for generating route guidance information at originating a telephone call in accordance with the second embodiment of the present invention.

FIG. 16 is a flowchart outlining a process for responding to the originating of a telephone call while receiving route guidance information. When the control section 31 detects an occurrence of an operation to initiate telephone communication such as, for example, an operation of call push button while sending route guidance information (S241), the control section 31 generates originating tone output (S242). The control section 31 then decreases the amount of information to be included in the route guidance information (S243). The route guidance information is generated in the control section 122 based on the guide level setting (S244) and then transmitted (S245). After completing transmission of the route guidance information, the telephone communication is initiated (S246). The guide level to be set when a telephone call is originated such that the amount of information to be included in the route guidance information is decreased to, for example, a minimum amount. This shortens the sending time of route guidance information and prevents telephone communication from being affected.

Figure 17:
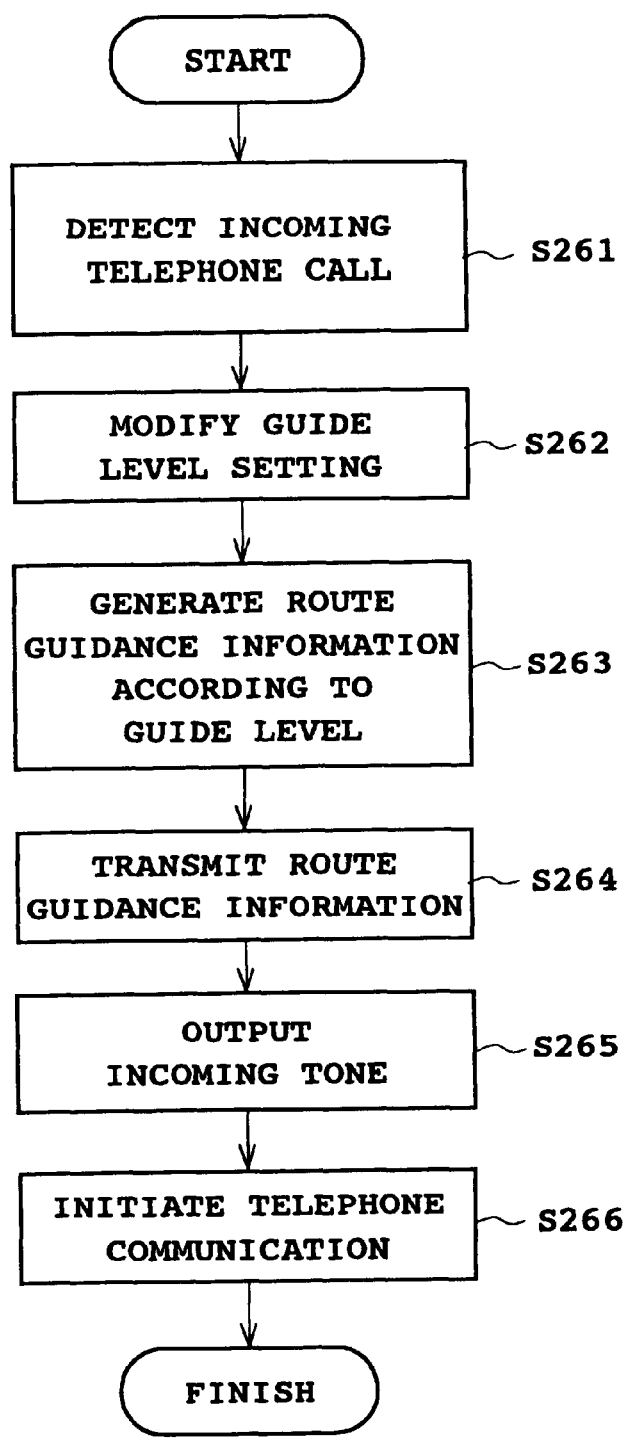
FIG. 17 is a flowchart outlining an example process for generating route guidance information at incoming a telephone call in accordance with the second embodiment of the present invention.

FIG. 17 is a flowchart outlining a process for responding to an incoming telephone call while receiving route guidance information. When recognizing an occurrence of an incoming telephone call while sending route guidance information (S261), the control section 31 sets a guide level such that the amount of information to be included in the route guidance information is decreased (S262). The control section 122 generates route guidance information based on the guide level setting (S263), sends the route guidance information (S264), and outputs incoming tone after completing the transmission (S265). The output allows telephone communication to be initiated (S266). In this case, the guide level at the occurrence of telephone communication is also determined in such a manner that the amount of information to be included in the route guidance information is decreased to, for example, a minimum similar to that set when a telephone call is originated as in the above example. This enables sending time of route guidance information to be reduced without affecting telephone communication.

EXAMPLE 2.6

Generation of Route Guidance Information Based on Communication Conditions of Communication Means or a Utilization History of Radio Communication Part As is the case with the above example 1.4, the control section 31 monitors communication conditions of the radio communication unit 27 or 38 and the control part 122 generates route guidance information according to the monitored conditions. For example, in a case where communication conditions are favorable with fewer interruptions, the guide level is set to guide level II as shown in FIG. 11(b) so that more information is included in the route guidance information to be transmitted. As opposed to this, in a case where communication conditions are poor with frequent interruptions, there is a necessity to work around the breakdown of communication. In this case, guide level is established at the guide level I as shown in FIG. 11(b) in order to provide a minimum amount of information in route guidance information to be transmitted. This limits the effects on navigation of a breakdown in communication.

It is also possible to interpolate the communication conditions from the utilization history of the radio communication part as in the case of the aforementioned example 1.4. The control section 31 monitors sending and receiving in the radio communication unit 27 or 38 and updates the utilization history of the radio communication part, which may be stored, for example, in the storage section 32. The control section 122 estimates a utilization frequency of the radio communication part from the history of sending and receiving. Prediction communications conditions based on the utilization history of the radio communication part contributes to reliability in route guidance.

EXAMPLE 2.7

Route Guidance in a Non-communication Area

In an embodiment 2.7, route guidance is executable even in a non-communication area along a travel route (guided route), similarly to the case in example 1.5. The configuration to be described is very similar to that for example 1.5, except that route guidance information (guide information data blocks) vary in configuration in this example according to the second embodiment. That is, the amount of route guidance information data that can be transmitted in the estimated time remaining before the vehicle will leave the communication area is estimated, and route guidance information corresponding to the guided route in a non-communication area is generated and transmitted according to the calculated data size in the process of S117 and S118. More specifically, for each information class, the total data size of information elements information class is calculated, and the guide level of route guidance information to be transmitted is determined according to the totals for each information class such that the data size of route guidance information does not exceed the maximum transmittable data size. For example, when the total size of information elements in information class 1 is smaller than the transmittable data size of the route guidance information as estimated, and the total size of information elements in information classes 1 and 2 is larger than the transmittable data size, the route guidance information should be generated as a set of information elements of information class 1, in other words as guide level I shown in FIG. 11(b). This generated route guidance information is transmitted in a specified timing. As a result, the route guidance information corresponding to the guide route in a non-communication area can be transmitted before the vehicle enters the non-communication area where communication will not be possible. It is then possible to execute route guidance even in the non-communication area.

EXAMPLE 2.8

Selection Based on Budget Considerations

Figure 18:
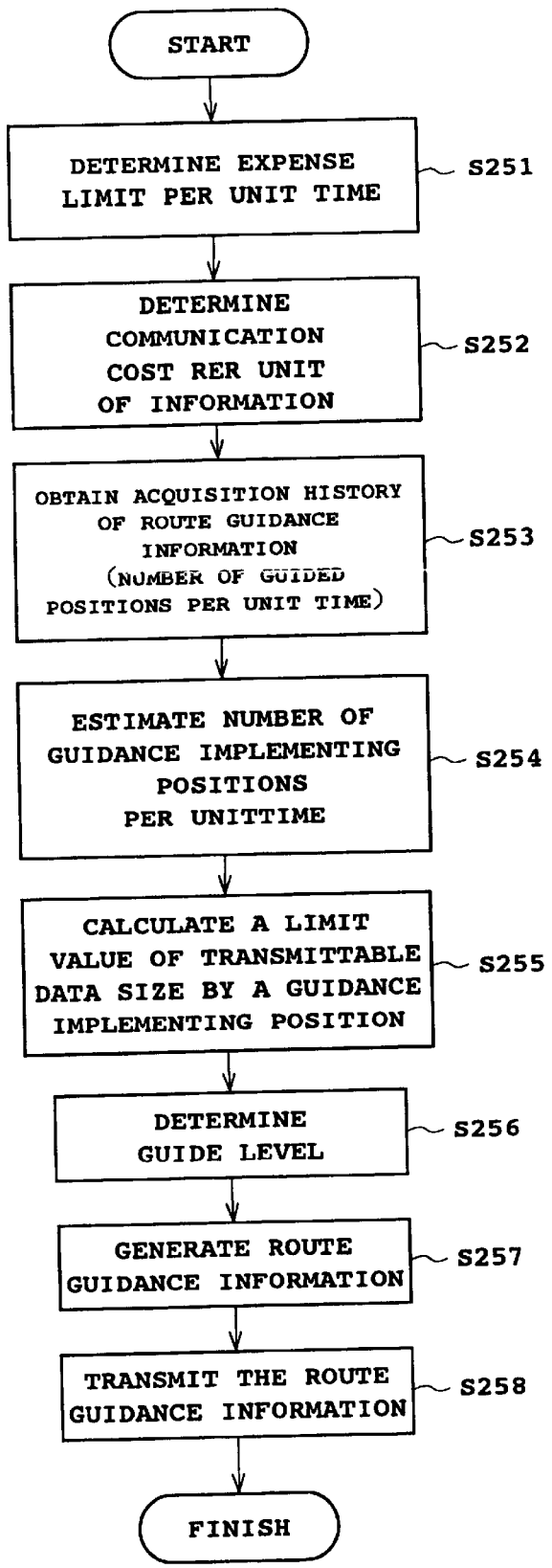
FIG. 18 is a flowchart outlining an example process for generating route guidance information in accordance with an embodiment 2.8.

FIG. 18 is a flowchart outlining a process for generating route guidance information in accordance with an example 2.8. The control section 31 first evaluates allowed communication expense per unit time Ct for the user (S251), then obtains communication expense per unit amount of information Cd (S252), and then obtains an acquisition history of route guidance information (number of guidance positions, time, or the like) stored in the storage section 32 (S253). Next to this, the control section 31 estimates the number of guidance positions per unit time in the future n from the number of guidance positions per unit time of the past in the acquisition history (S254). The control section 31 calculates a data size limit value by guidance position D within the limits of the communication expense value per unit time Ct, communication expense per unit amount of information Cd, and the number of guidance positions per unit time n (S255).

To be precise, an equation of restriction of expense Ct>D·n·Cd establishes a data size limit value by guidance position D<Ct/(n·Cd). The control section 31 determines a guide level or information class which complies with the data size limit (S256). The control section 122 in the information center 120 generates (S257) and transmits (S258) route guidance information according to the determined level. Because the procedure for determining guide levels corresponding to data size in the process of S256 is equivalent to the procedure employed in examples 2.7 and 1.5, a detailed explanation will not be repeated here. The configuration described in this example allows for the consideration of budgetary limitations when preparing route guidance information.

EXAMPLE 2.9
Selection by Knowledge About the Position or Area

FIG. 19(*a*) is a flowchart outlining a process for generating route guidance information in according to an example 2.9. The control section 31 first obtains location information of the in-vehicle device 30 (S281), then obtains travel history information stored, for example, in the storage section 32 (S282), and then compares an area trip count for journeys over the target guide position na with a prescribed value m (S283). When the area trip count is larger than the prescribed value m, guide level is determined according to the area trip count (S284). An example of determination method of the guide level is described in FIG. 19(*b*). In this example, the guide level is divided into three phases using two threshold values Xa and Ya. The guide level is set to be lower as the traveled number decreases, in order to reduce the amount of information to be included in route guidance information. In addition, when the area trip count is smaller than the prescribed value m, the present time is obtained (S285) and the guide level is determined based on the amount of time that has elapsed since the last trip (S286). An example of determination method of the guide level of this case is described in FIG. 19(*c*). In this example, the guide level is divided into three phases using two threshold values Xt and Yt. And the guide level is set to be lower as time t decreases in order to reduce the amount of information element types to be included in route guidance information. The route guidance information is generated in the control section 122 based on the guide level determined in the processes of S284 and S286 (S287) and transmitted (S288). Thus, selecting types of information to be included in the route guidance information based on an area trip count or the time elapsed since the last trip leads to conservation of communication time and costs.

EXAMPLE 2.10
Selection by Position Memory Data

Figure 20A:
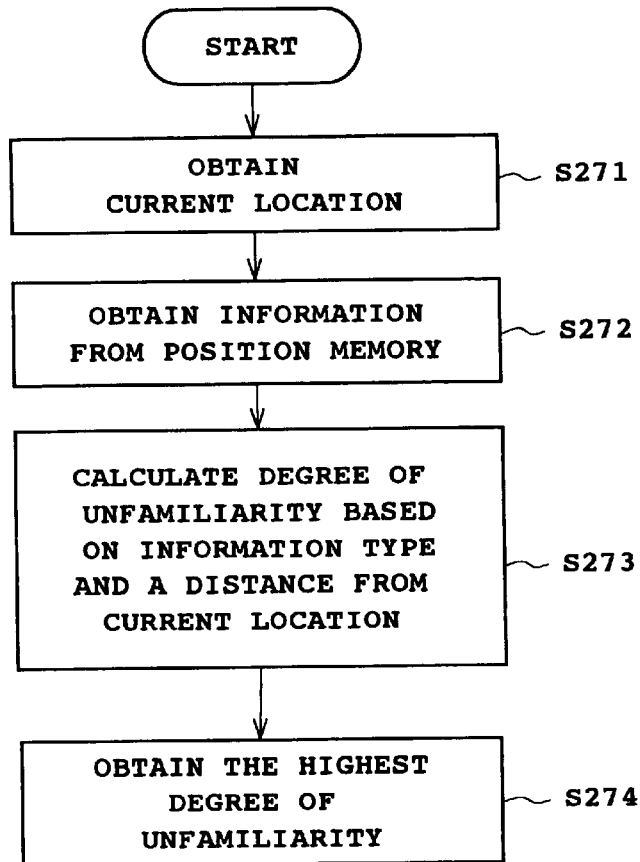
FIG. 20(a) and FIG. 20(b) show a flow chart and a table outlining an example process for generating route guidance information and an example of a determined guide level in accordance with the second embodiment of the present invention.
Figure 20B:
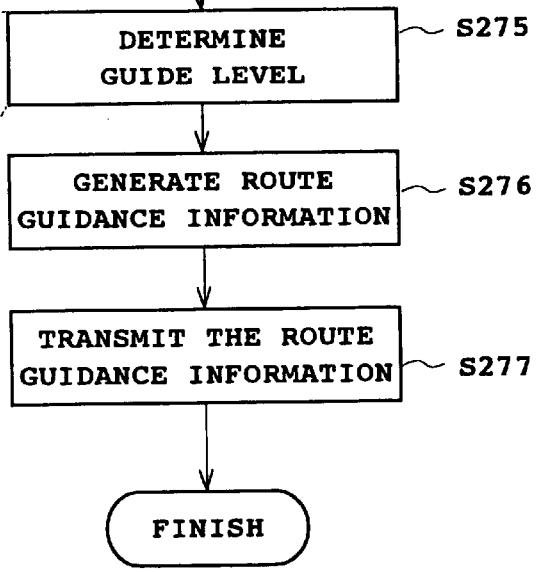

FIG. 20(*a*) is a flowchart outlining a process for generating route guidance information in accordance with an example 2.10. The control section 31 first obtains location information of the in-vehicle device 30 (S271), then obtains position memory information (S272). The position memory information wherein unfamiliar locations are considered familiar for the first two or more instances (e.g. five instances) a target guide position is to be passed, is stored in, for example, the storage section 32. Next, the control section 31 calculates degree of familiarity for the present location based on the distance from a location registered in the position memory information (S273). The control section 31 then determines guide level according to the highest unfamiliar degree among two or more registered locations in the location memory (S274). An example of determination of guide level with this method is illustrated in FIG. 20(*b*). In this example, the guide levels are divided into three phases using two threshold values Xi and Yi. The guide level is established so as to be lower for lower degrees of unfamiliarity ni in order to reduce the amount of information included in the route guidance information. The route guidance information based on the determined guide level is generated (S276) and transmitted (S277). Thus, selecting types of information elements to be included in the route guidance information in consideration of the location memory information further contributes to conservation of communication time and costs.

A third preferred embodiment of the present invention will next be described below with reference to the attached drawings and through use of illustrative examples. In the examples used to illustrate the third embodiment, a system for providing route guidance information of the present invention is applied to an automobile navigation system.

In the first and second embodiments described above, the route guidance information is preferably generated as circumstances demand through adjusting packaging operations against information elements or by selecting information elements or types. In the third embodiment, however, data selection is based on guidance positions where navigation is executed according to circumstances. The selection in accordance with this embodiment can be applied in combination with any of the other embodiments described in this specification. This embodiment will be described below applied to the automobile navigation system configuration of the second embodiment as depicted in FIG. 10 in accordance with various sample modifications. Data for guidance position is stored in an information data storage section 23. The control section 122 or 31 refers to the information data storage section 23 for generating route guidance information or guide information data blocks, and selects and determines the guidance position from potential guidance positions according to circumstances. Generation of route guidance information in the control section 122 is based on this decision.

EXAMPLE 3.1
Selection of Guidance Positions According to Road Type

Figure 21:
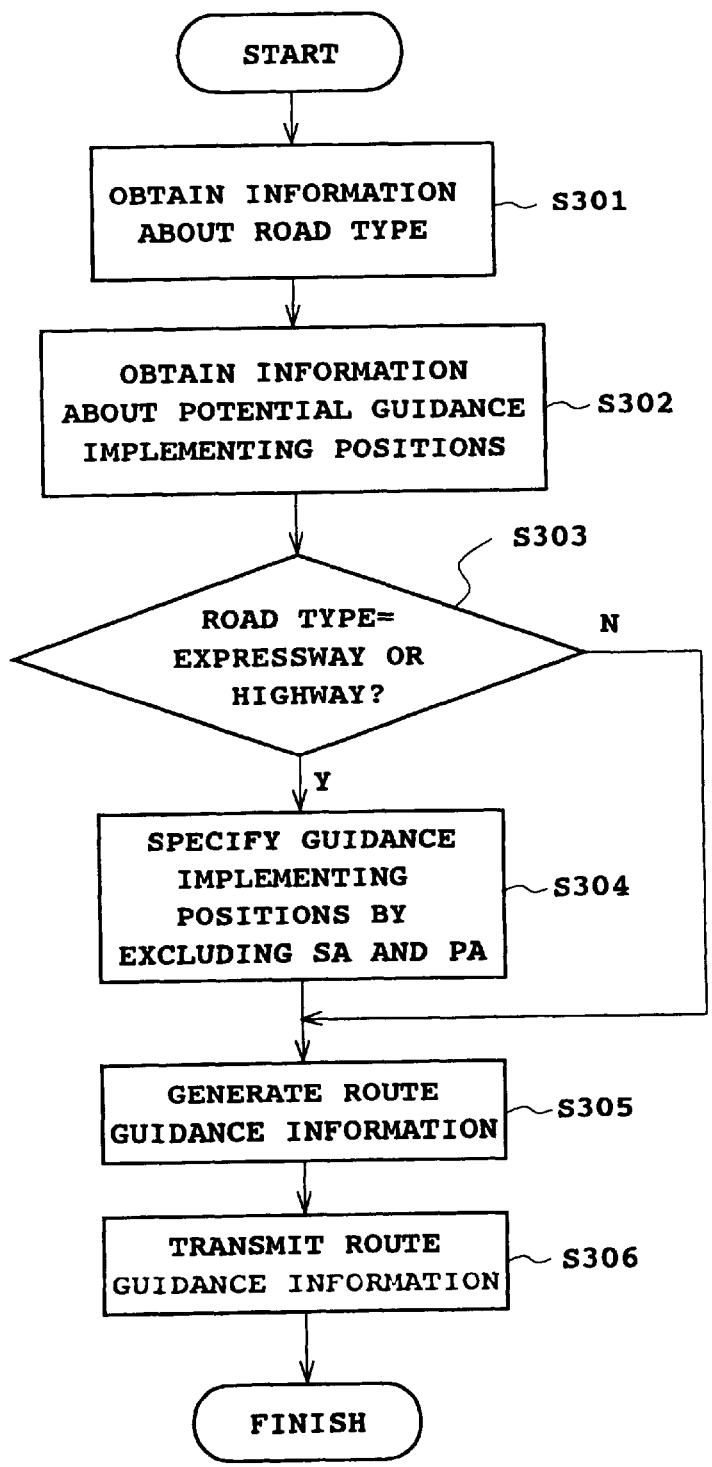
FIG. 21 is a flowchart outlining an example process for generating route guidance information in accordance with a third embodiment of the present invention.

FIG. 21 is a flowchart outlining a process for selecting a guidance position in accordance with an example 3.1. The control section 122 first obtains information concerning the type of road on which the in-vehicle device 30 is traveling, or is scheduled to travel, and information about potential guidance positions (S301, S302) and then selects the potential guidance positions according to the road type detected. When the road type is detected as an expressway or highway (S303), the guidance positions are selected and designated to exclude or eliminate the potential guidance positions corresponding to target guide positions of a service area (SA) or parking area (PA) (S306). Following this, route guidance information about the guidance positions is generated (S305), and transmitted to the in-vehicle device (S306). Navigation guidance need not be provided at all potential guidance positions when traveling on an expressway or highway because relatively sufficient route guidance is provided on those motorways. Especially, the need to provide navigation for each SA or PA is extremely low. Under these conditions, therefore, selecting guidance positions reduces the amount of information provided in the route guidance information and leads to conservation of transmission time and costs.

Figure 22:
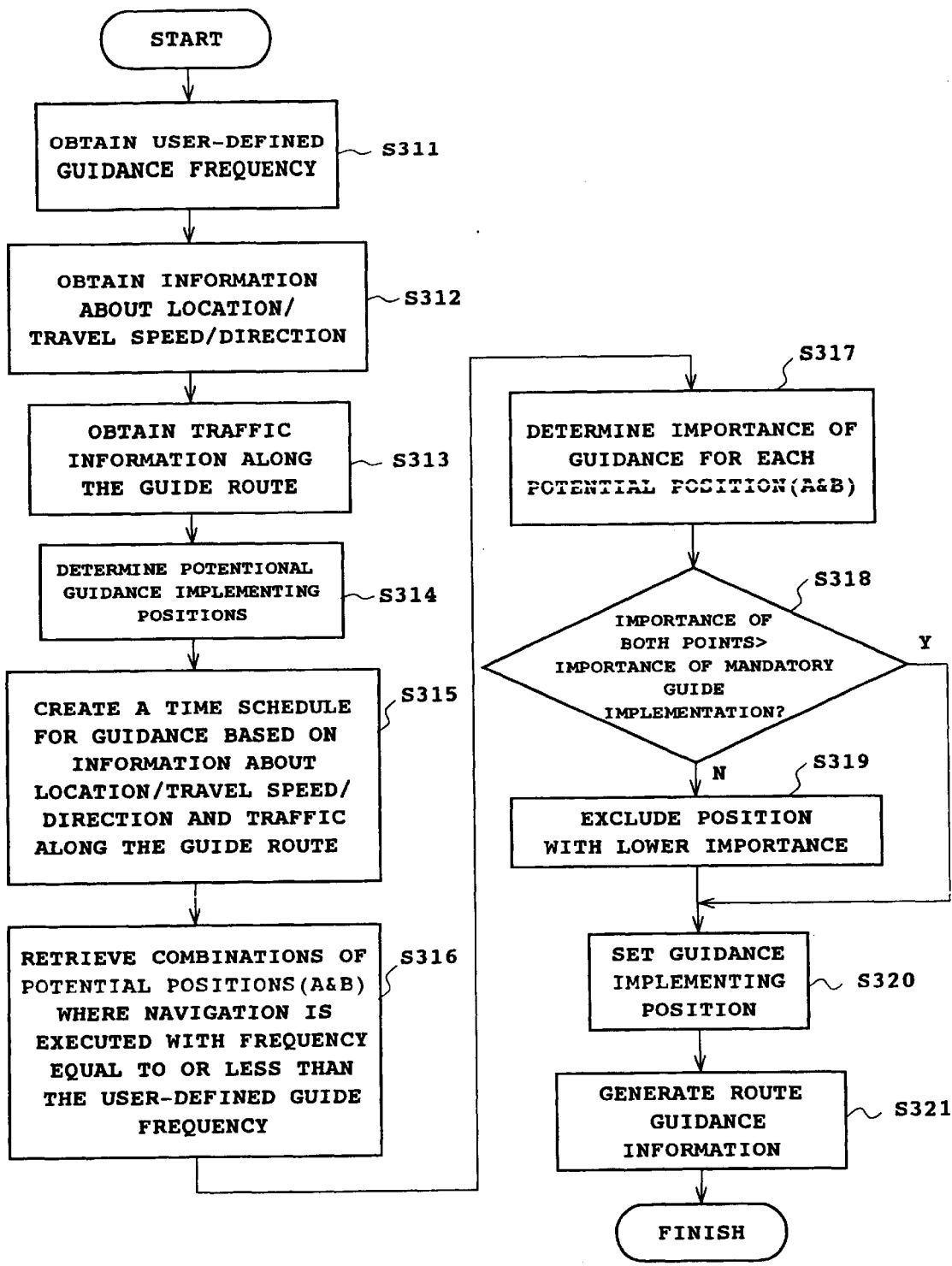
FIG. 22 is a flowchart outlining an example process for generating route guidance information in accordance with the third embodiment of the present invention.

EXAMPLE 3.2
Selection of Guidance Positions According to a User-defined Navigation Implementation Frequency FIG. 22 is a flowchart outlining a process for selecting a guidance position in accordance with an example 3.2. The control section 31 first obtains information about a user-defined route guidance frequency (S311). The route guidance frequency is a value defining how frequently route guidance is to be executed and may be in the form of a user-defined interval such as, for example, "every five minutes" or the like. After obtaining this route guidance frequency, the control section 31 determines potential positions for providing route guidance based on the travel state of an automobile and traffic conditions along the guided route (from S312 to S314), and then creates a guidance schedule accordingly (S315). The control section 31 then retrieves combinations of potential guidance positions such that the time interval between a plurality of potential positions is shorter than the user-defined route guidance frequency. That is, combinations of the potential guidance positions such that navigation is executed at time intervals shorter than the planned time intervals (the combination of positions A and B in the example of FIG. 22) are retrieved (S316). Then, the control section 31 determines the importance of route guidance specified to each potential position component of the combination (S317). The importance of guidance is individually determined for each guidance position and the value thereof is set higher as a distance to the target guide position, such as an intersection, decreases. The importance of guidance of potential positions is compared with the level of importance at or beyond which guidance is considered necessary or mandatory, and for each potential position it is decided whether or not route guidance is mandatory (importance meaning the level to which navigation is indispensable) (S318). When two or more positions are determined to not be mandatory, one or more potential positions of lower importance are eliminated as candidates (S319), and the remaining potential positions are determined to be guidance positions (S320) at which navigation is to be implemented. Route guidance information is generated for these potential positions (S321). It is thus possible to prevent navigation from being executed more often than a user-defined frequency.

A fourth preferred embodiment of the present invention is described below in accordance with the accompanying drawings and through use of examples. In the examples used to illustrate the fourth embodiment, a system for providing route guidance information of the present invention is applied to an automobile navigation system.

The route guidance information corresponding to an adjusted effective segment length is generated in this embodiment. The adjustment is such that the effective segment length for route guidance information is regulated according to predetermined conditions. Although route guidance information is usually generated in effective segments, the length of which is corresponds to a predetermined effective segment length, in the configuration of this embodiment, data size of route guidance information is adjusted by regulating the effective segment length according to circumstances. The adjustment of the effective segment length in accordance with this embodiment can be applied to the route guidance information or the guide information data blocks of any of the other embodiments of the present invention, as required. This embodiment will be described using example applications to the automobile navigation system configuration of the second embodiment as depicted in FIG. 10.

EXAMPLE 4.1
Setting of Effective Segment Length According to Road Type

Figure 23:
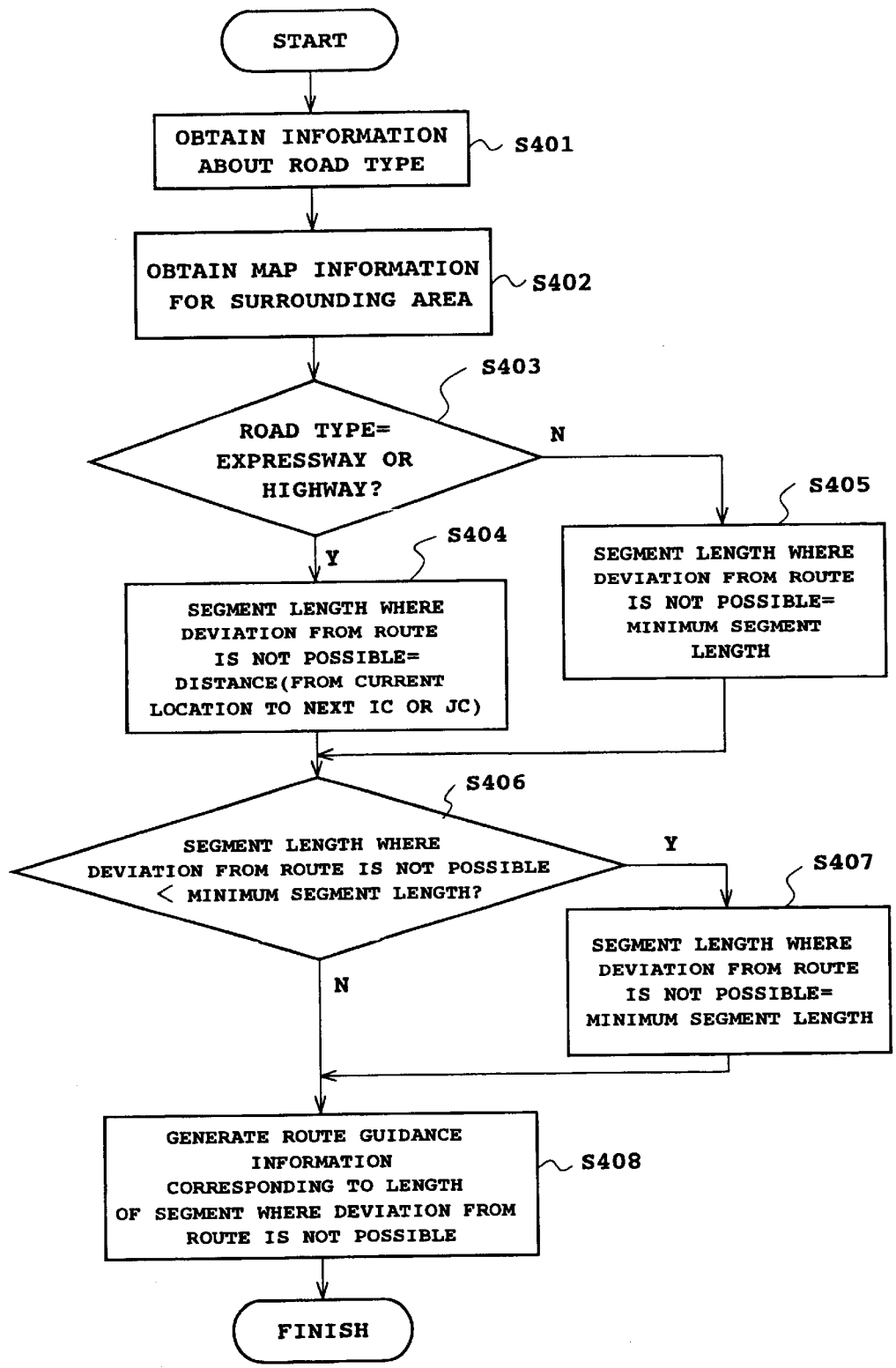
FIG. 23 is a flowchart outlining an example process for generating route guidance information in accordance with a fourth embodiment of the present invention.

FIG. 23 is a flowchart outlining a process for setting an effective segment length according to road type in accordance with an example 4.1. The control section 122 first obtains road type and map information for the current location of the in-vehicle device 30 (S401, S402) and determines the road type (S403). When the road type is an expressway or highway, the distance from a current location to a next interchange (IC) or junction (JC) is set as a segment length where deviation from the route is not possible (S404). When the road is a limited access road such as an expressway or highway, the minimum segment length for route guidance is set as the segment length where deviation from route is not possible (S405). Following this, the segment length where deviation is not possible is compared with the minimum required segment length (S406). The length of the segment where deviation is not possible is set as the minimum segment length when it is shorter than the minimum required segment length (S407). The effective segment length is then adjusted using the segment length in which deviation is not possible. Next, route guidance information is generated for the adjusted segment (S408). For limited access roads such as expressways or highways, where the length of road in which deviation is not possible can be measured, setting the effective segment length to be the length where deviation is not possible helps to provide minimum and sufficient route guidance information, and also helps to conserve communication time and costs.

EXAMPLE 4.2
Setting of Effective Segment Length Based on Travel History

Figure 24:
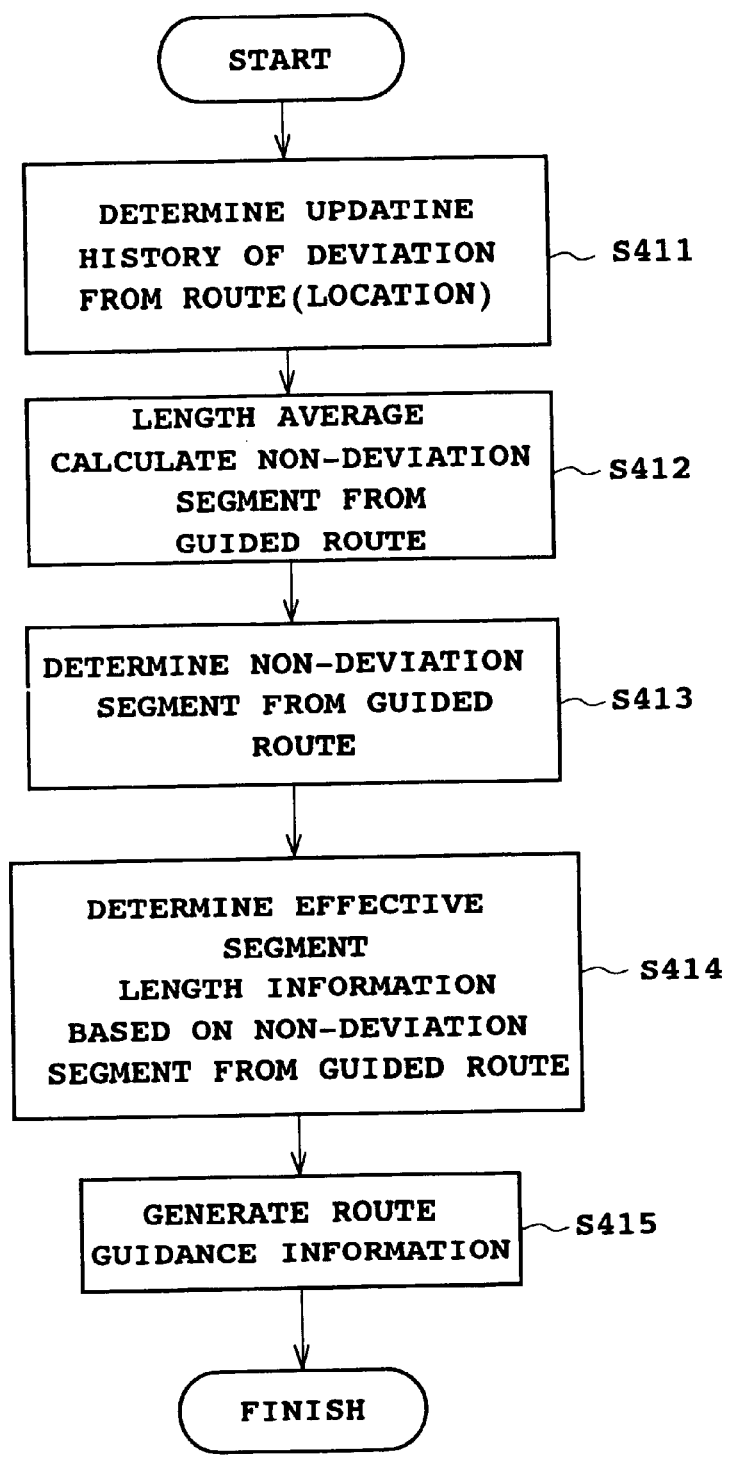
FIG. 24 is a flowchart outlining an example process for generating route guidance information in accordance with the fourth embodiment of the present invention.

FIG. 24 is a flowchart outlining a process for setting an effective segment length based on travel history according to an example 4.2. The control section 31 monitors a travel history and updates a history of deviation from the guided route. For generating route guidance information, the control section 31 first obtains information of the history of deviation from route (S411), then calculates a non-deviation segment from previous route guidance (S412), and determines a future non-deviation segment wherein the operator is unlikely to deviate from the guided route based on the calculated non-deviation segment (S413). The control section 31 then determines an effective segment length (S414) based on this determination and generates route guidance information corresponding to the effective segment length (S415). Setting the effective segment length based on the estimate for the non-deviation segment in this manner further helps ensure that minimum and sufficient route guidance information is provided so that transmission time and costs will be reduced.

EXAMPLE 4.3
Setting of Effective Segment Length Based on Data Storage Capacity

Figure 25:
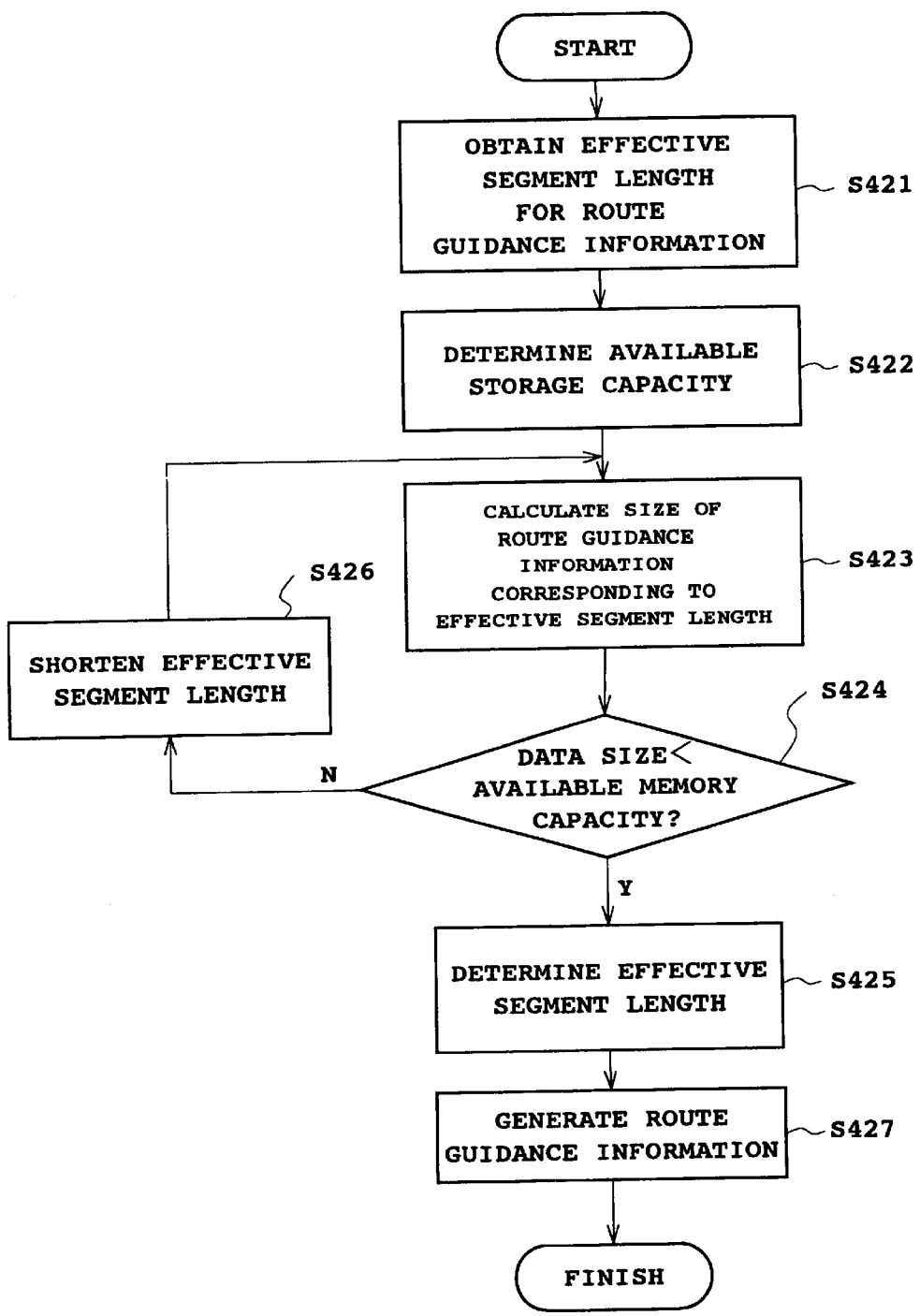
FIG. 25 is a flowchart outlining an example process for generating route guidance information in accordance with the fourth embodiment of the present invention.

FIG. 25 is a flowchart outlining a process for setting an effective segment length based on an available storage space of the in-vehicle device in accordance with an example 4.3. The control section 122 first obtains the predetermined effective segment length (S421) and then the available storage space in the storage section 32 of the in-vehicle device 30 (S422). Next, the control section 122 calculates the size of the route guidance information data corresponding to the effective segment length (S423) and compares this with the available storage space (S424). When the resulting data size is larger than the available storage space, the control section 122 decides that the effective segment length (S426) must be shortened and returns to step S423. The control section 122 repeats this procedure until the resulting data size is smaller than the available storage space, and then sets the effective segment length (S425) and generates route guidance information (S427) accordingly. As a result, wasteful transmission of information which exceeds the capacity is eliminated and time and cost required for transmission are reduced.

Figure 26:
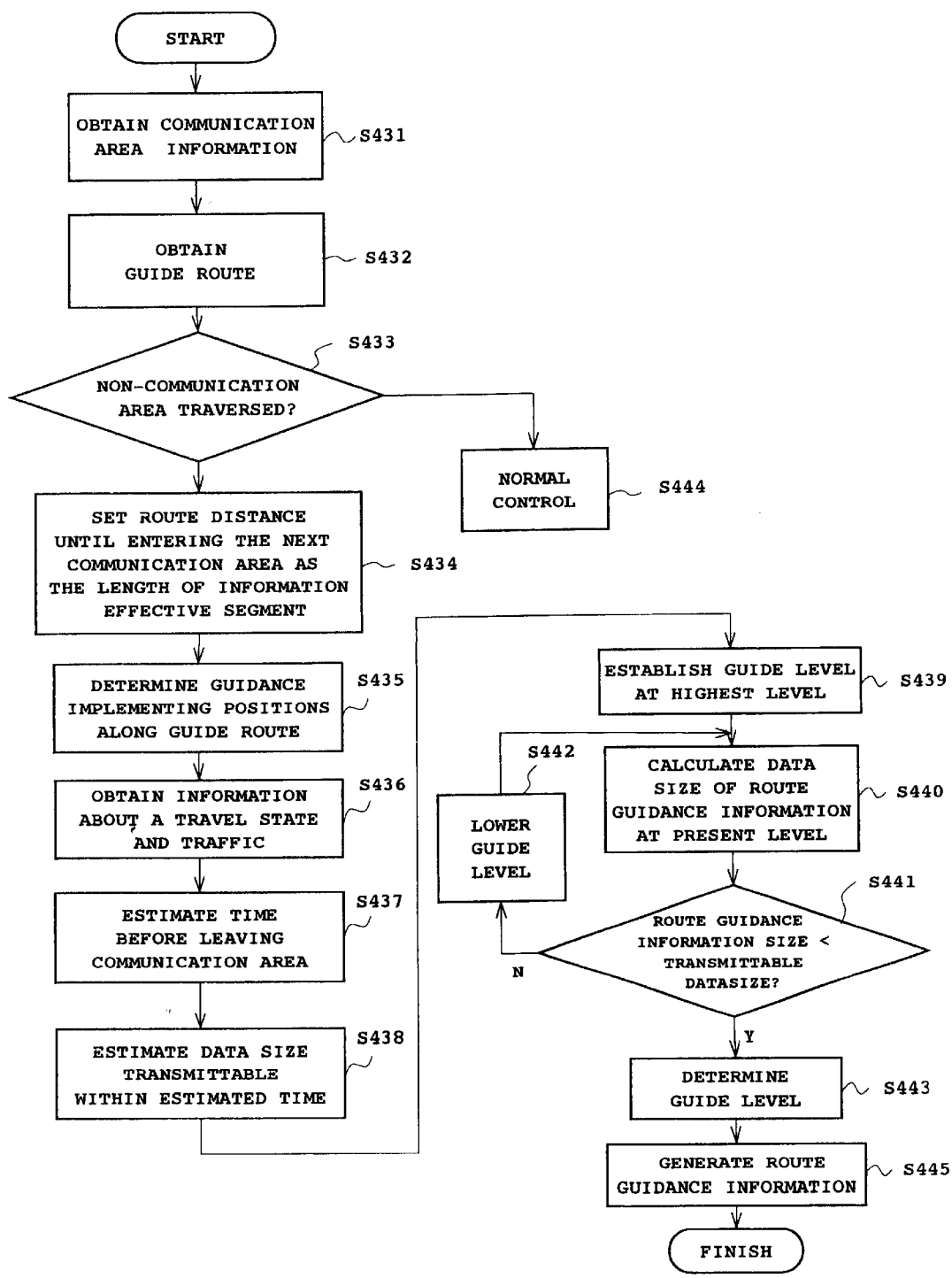
FIG. 26 is a flowchart outlining an example process for generating route guidance information in accordance with the fourth embodiment of the present invention.

EXAMPLE 4.4
Setting of Effective Segment Length According to Communication Area FIG. 26 is a flowchart outlining a process for setting an effective segment length according to a communication area in accordance with an example 4.4. The control section 31 first obtains communication area information (S431), then discriminates between communication area, where communication between the vehicle and the center is possible, and non-communication areas, where communication is not possible, and then obtains the route information for the entire guided route (S432). Following this, the control section 31 determines whether or not the guided route will pass through a non-communication area (S433). If there are no such instances, normal control is performed (S444). However, when it is found that the intended route will pass through an area where communication is likely to be impossible, the control section 31 sets the route distance in between communication areas as the effective segment length (S434), and accordingly determines guidance positions within the guided route (S435). The control section 31 then obtains a travel state and traffic information (S436), estimates the amount of time before the vehicle will leave the communication area (S437), and then estimates the amount of data transmittable within the estimated time (S438). The route guidance information corresponding to the non-communication area is generated according to the estimated data size. To be more specific, the control section 31 sets the guide level to the level at which the largest information volume is included (S439) and calculates the data size of route guidance information at the specified level (S440). When the resulting data size is larger than the transmittable data size, the control section 31 resets the guide level to a level at which a smaller volume of information is included (S442), and returns to step S440. The control section 31 repeats this process until the size of route information is smaller than the transmittable data size in the end, then determines the effective segment length (S443) accordingly, and generates route guidance information (S445) based on this determination. After the effective segment length is set to a segment length spanning the non-communication area, route guidance information can be specified by determining the guide level in the same manner as illustrated in examples 1.5 and 2.7. As described above, it is possible to further reduce wasteful transmission of unreceivable route guidance information.

A fifth preferred embodiment of the present invention will next be described in accordance with the accompanying drawings and through use of examples. In the examples used to illustrate the fifth embodiment, a system for providing route guidance information of the present invention is applied to an automobile navigation system.

In a case where two or more different data formats for information elements such as voice data exist, the data format of the information elements to be included in the route guidance information can be selected according to circumstances. This embodiment applying to the automobile navigation system configuration of the second embodiment depicted in FIG. 10 will be described below in accordance with various sample modifications.

EXAMPLE 5.1
Selection of Data Format for Voice Data

Figure 27:
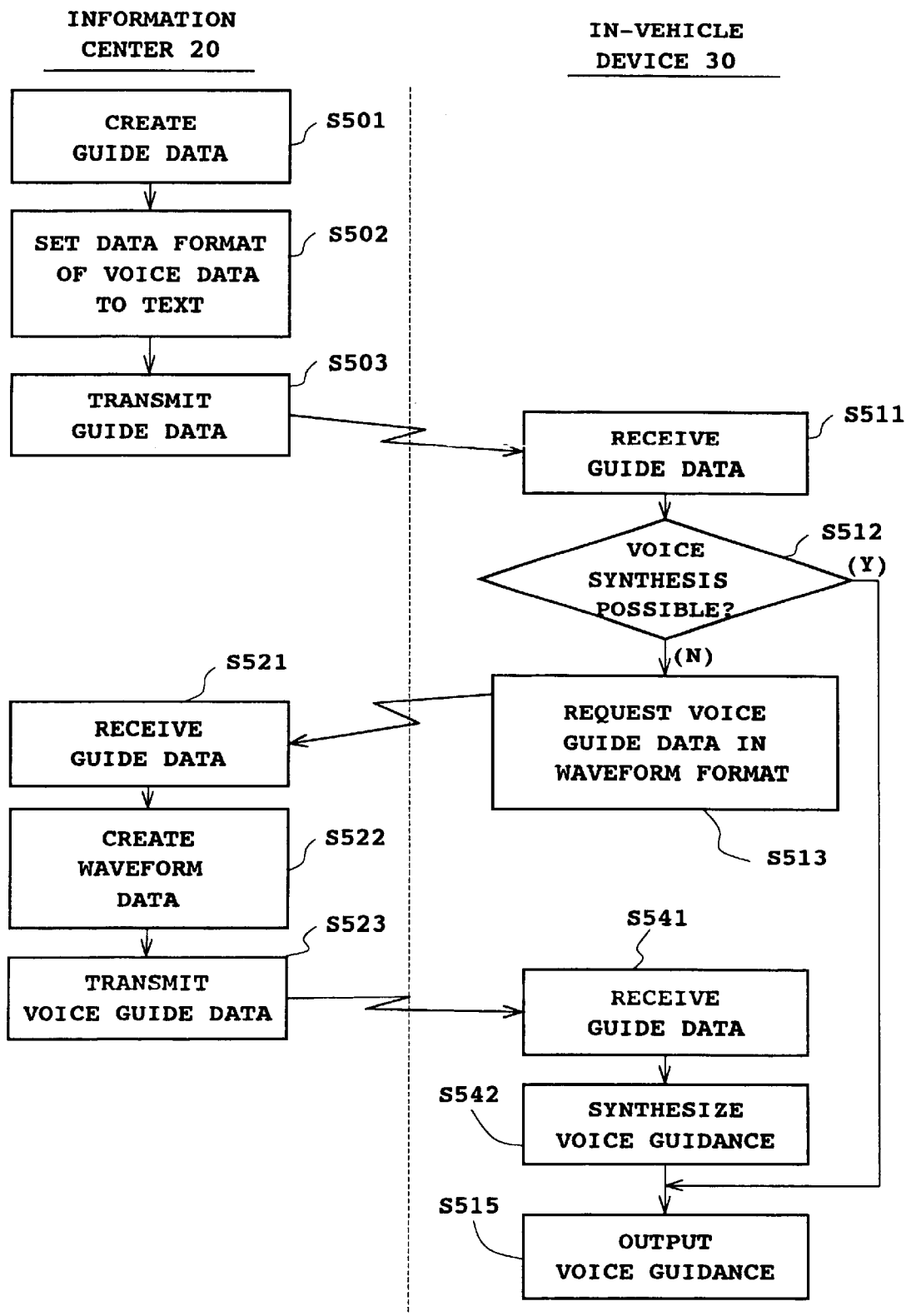
FIG. 27 is a flowchart outlining an example method for selecting a data format in accordance with in accordance with a fifth embodiment of the present invention.

FIG. 27 is a flowchart of an example method for selecting a data format in accordance with an example 5.1. The control section 122 creates guide data, such as the route guidance information, including voice data in text format (S501, S502), and sends the guide data to the in-vehicle device 30 (S503). The in-vehicle device 30 receives the data (S511), and determines whether or not the data can be used for voice synthesis in the control section 31 (S512). When it is determined that synthesis is impossible, the in-vehicle device 30 requests the information center 120 to provide additional information by asking that the voice data be retransmitted as waveform data (S513). However, when voice synthesis is determined possible at S512, the in-vehicle device 30 sends the data to the voice reproducing section 34 and outputs appropriate voice guidance from the voice output section 37 (S514). When the information center 120 receives from the in-vehicle device 30 a request for provision of information generated at step S513 (S521), the information center 120 creates information including waveform voice (S522) and transmits this additional information to the in-vehicle device 30 (S523). The in-vehicle device receives the waveform data (S541), synthesizes oral guidance in the voice guide synthesis part 35 (S542), replays it in the voice reproducing section 34 at an established timing, and outputs oral guidance through the voice output section 37 (S514). In this example, the more compact data format is first selected and route guidance information including the information elements in the selected data format is sent first. This makes it possible to implement route guidance in the in-vehicle device capable of reproducing information elements in the more compact data format, while enabling further reduction of time and costs necessary for providing information.

In addition, selecting among data format as appropriate makes it possible to transmit just information in the selected format, as described above. This allows for still further reduction of communication time and costs. The information center 120 can be configured for communication of information as specified by the in-vehicle device 30. The information center 120 then sends information in the data format as specified in a request received from the in-vehicle device 30. Furthermore, the in-vehicle device 30 may also send signals for rejecting, rather than requesting, transmission of information in certain data formats. In such a case, the information center 20 transmits information to the in-vehicle device 30 in a data format other than that rejected. Using code data wherein voice information elements are coded instead of text data in this embodiment produces a similar effect.

It is to be understood that this invention is not limited to the examples or embodiments described above. It is, for example, possible to execute combine one or more of: setting guide levels, establishing information class, selecting guidance positions, adjusting a effective segment length, and selecting data format of information elements. Any of these processes may be preferably performed in either or both of the in-vehicle device and in the information center For example, the in-vehicle device and information center are both capable of exercising the control. The in-vehicle device and information center may also share the load of control, or may individually conduct control as necessary. In a case where control is performed on the communication terminal side, setting guide levels, establishing information class, selecting guidance positions, adjusting a effective segment length, and selecting data format of information elements are performed in the communication terminal, and signals to indicate these settings or selections are sent to the information center from the communication terminal. The information center then generates route guidance information according to the received signals. The information class setting table, guide level setting table, user setting table, or information of each history described above may be stored in any storage device, unit, or section on the information center side or the in-vehicle device side.

Furthermore, it is to be understood that the present invention may be applied to a communication terminal other than the in-vehicle device and an apparatus for providing route guidance information other than the information center.

It is possible to set or modify the data size or data structure of route guidance information to be transmitted according to the circumstances in this invention as described above. This allows a time and costs required for communication to be reduced, while simultaneously allowing for navigation guidance to provided more frequently and reliably, which in turn enables users to navigate more effectively.

What is claimed is:

1. An apparatus for providing route guidance information to a communication terminal, said apparatus comprising:

means for extracting and reading out, from an information data storage unit, a plurality of information elements for use in route guidance, each of said information elements having an information class specified for classifying said elements;

means for correlating each of said information classes to a guide level used as an indicator for sending said route guidance information;

means for generating guide information data blocks using said plurality of information elements that were read out, each of said blocks including information elements correlated to one guide level; and communication means for transmitting, in a sequence according to said guide levels, said guide information data blocks as route guidance information.

2. An apparatus for providing route guidance information according to claim 1, wherein said means for generating guide information data blocks creates a block of guide information including information elements for visual guidance and a block of guide information including information elements for voice guidance, and said communication means transmits said block of guide information including information elements for voice guidance prior to transmitting said block of guide information including information elements for visual guidance.

3. An apparatus for providing route guidance information according to claim 1, wherein said information elements are classified by category, and said means for generating guide information data blocks creates a plurality of guide information data blocks such that each block consists of information elements of a same category.

4. An apparatus for providing route guidance information according to claim 1, wherein said means for generating guide information data blocks creates a plurality of guide information data blocks of different sizes, and said communication means assigns a higher transmission priority to the smaller size guide information data blocks.

5. An apparatus for providing route guidance information according to claim 1, wherein said means for generating guide information data blocks creates said guide information data blocks based on a history of deviation from the route directed by the route guidance information transmitted to the communication terminal.

6. An apparatus for providing route guidance information according to claim 1, wherein said means for generating guide information data blocks creates the guide information data blocks on the basis of communication conditions at said communication means.

7. An apparatus for providing route guidance information according to claim 1, wherein said means for generating guide information data blocks creates the guide information data blocks on the basis of a utilization history in said communication means.

8. An apparatus for providing route guidance information according to claim 1, wherein said means for generating guide information data blocks estimates the amount of time a vehicle will remain in a communication area and creates the guide information data blocks on the basis of the estimated amount of time.

9. An apparatus for providing route guidance information according to claim 1, wherein said means for generating guide information data blocks creates a plurality of guide information data blocks such that the information elements comprising each block contain the same information in different data formats.

10. An apparatus for providing route guidance information according to claim 1, wherein the means for generating includes a transmission terminal that is capable of controlling creation of the guide information data blocks in said means for generating at least one of guide information data blocks and a transmission sequence of the guide information data blocks.

11. An apparatus for providing route guidance information to a communication terminal, said apparatus comprising:

a means for generating route guidance information which selects an information element type and creates route guidance information including information elements of the selected type, and a communication means for transmitting said route guidance information to a communication terminal, wherein said means for generating route guidance information selects an information element type based on a travel speed of the communication terminal.

12. An apparatus for providing route guidance information to a communication terminal, said apparatus comprising:

a means for generating route guidance information which selects an information element type and creates route guidance information including information elements of the selected type, and a communication means for transmitting said route guidance information to a communication terminal, wherein said means for generating route guidance information selects an information element type based on a history of deviation from the route directed by the route guidance information transmitted to the communication terminal.

13. An apparatus for providing route guidance information to a communication terminal, said apparatus comprising:

a means for generating route guidance information which selects an information element type and creates route guidance information including information elements of the selected type, and a communication means for transmitting said route guidance information to a communication terminal, wherein said means for generating route guidance information selects an information element type based on a storage capacity within the communication terminal.

14. An apparatus for providing route guidance information to a communication terminal, said apparatus comprising:
- a means for generating route guidance information which selects an information element type and creates route guidance information including information elements of the selected type, and
- a communication means for transmitting said route guidance information to a communication terminal, wherein said means for generating route guidance information detects the occurrence of telephone communication in said communication means and selects an information element type according to the detected occurrence.

15. An apparatus for providing route guidance information to a communication terminal, said apparatus comprising:
- a means for generating route guidance information which selects an information element type and creates route guidance information including information elements of the selected type, and
- a communication means for transmitting said route guidance information to a communication terminal, wherein said means for generating route guidance information selects an information type on the basis of a utilization history in said communication means.

16. An apparatus for providing route guidance information to a communication terminal, said apparatus comprising:
- a means for generating route guidance information which selects an information element type and creates route guidance information including information elements of the selected type, and
- a communication means for transmitting said route guidance information to a communication terminal, wherein said means for generating route guidance information estimates the amount of time a vehicle will remain in a communication area and selects an information element type on the basis of the estimated time.

17. An apparatus for providing route guidance information to a communication terminal, said apparatus comprising:
- a means for generating route guidance information which selects an information element type and creates route guidance information including information elements of the selected type, and
- a communication means for transmitting said route guidance information to a communication terminal, wherein said means for generating route guidance information selects an information element type according to an input limit for transmission expenses.

18. An apparatus for providing route guidance information to a communication terminal, said apparatus comprising:
- a means for generating route guidance information which selects an information element type and creates route guidance information including information elements of the selected type, and
- a communication means for transmitting said route guidance information to a communication terminal, wherein said means for generating route guidance information selects an information element type on the basis of a travel history.

19. An apparatus for providing route guidance information to a communication terminal, said apparatus comprising:
- a means for generating route guidance information which selects an information element type and creates route guidance information including information elements of the selected type, and
- a communication means for transmitting said route guidance information to a communication terminal, wherein said means for generating route guidance information selects an information type based on information of the degree of unfamiliarity of a position.

20. An apparatus for providing route guidance information to a communication terminal, said apparatus comprising:
- a means for generating route guidance information which selects a guidance position at which route guidance is to be executed from among potential guidance positions where route guidance for that position is executable, and generates route guidance information including information about the selected guidance position, and
- a communication means for transmitting said route guidance information to a communication terminal, wherein said means for generating route guidance information selects said guidance position according to an established guidance frequency.

21. An apparatus for providing route guidance information to a communication terminal, said apparatus comprising:
- a means for generating route guidance information which adjusts an effective segment length for route guidance information according to a determined condition and generates route guidance information corresponding to the adjusted effective segment length, and a communication means for transmitting said route guidance information to a communication terminal.

22. An apparatus for providing route guidance information according to claim 21, wherein said means for generating route guidance information adjusts the effective segment length based on a road type.

23. An apparatus for providing route guidance information according to claim 21, wherein said means for generating route guidance information adjusts the effective segment length based on a history of deviation from the route directed by the route guidance information transmitted to the communication terminal.

24. An apparatus for providing route guidance information according to claim 21, wherein said means for generating route guidance information adjusts the effective segment length based on a storage capacity within the communication terminal.

25. An apparatus for providing route guidance information according to claim 21, wherein said means for generating route guidance information estimates the amount of time the vehicle will remain in a communication area and adjusts said effective segment length on the basis of the estimated time.

26. An apparatus for providing route guidance information according to claim 21, wherein the means for generating includes a transmission terminal that is capable of adjusting the effective segment length in said means for generating route guidance information.

27. An apparatus for providing route guidance information to a communication terminal, said apparatus comprising:
- a means for generating route guidance information which selects a data format for information elements stored in a plurality of data formats and generates route guidance information including information elements in the selected data format, and a communication means for transmitting said route guidance information to a communication terminal, wherein said means for generating route guidance information selects a data format in which the data size of information will be smaller.

28. A system for providing route guidance information, comprising:

an apparatus for providing route guidance information, said apparatus including means for extracting and reading out, from an information data storage unit, a plurality of information elements for use in route guidance, each of said information elements having an information class specified for classifying said elements;

means for correlating each of said information classes to a guide level used as an indicator for sending said route guidance information;

means for generating guide information data blocks using said plurality of information elements that were read out, each of said blocks including information elements correlated to one guide level;

communication means for transmitting, in a sequence according to said guide levels, said guide information data blocks as route guide information; and a communication terminal which receives route guidance information from said apparatus for providing route guidance information and executes route guidance according to said route guidance information.

29. A communication terminal which receives route guidance information generated in an apparatus for providing route guidance information and which executes route guidance according to said route guidance information, said communication terminal comprising:

communication means for receiving, as said route guidance information, guide information data blocks sequentially transmitted from said apparatus for providing route guidance information, said apparatus including means for extracting and reading out, from an information data storage unit, a plurality of information elements for use in route guidance, each of said information elements having an information class specified for classifying said elements;

means for correlating each of said information classes to a guide level used as an indicator for sending said route guidance information;

means for generating guide information data blocks using said plurality of information elements that were read out, each of said blocks including information elements correlated to one guide level;

communication means for transmitting, in a sequence according to said guide levels, said guide information data blocks as route guidance information; and control means for executing route guidance based on said received route guidance information.

30. A communication terminal which receives route guidance information generated in an apparatus for providing route guidance information and which executes route guidance according to said route guidance information, said communication terminal comprising:

a communication means wherein a plurality of guide information data blocks sequentially transmitted from said apparatus for providing route guidance information are received as route guidance information, said data blocks having been created in said apparatus for providing route guidance information from root guide information including a plurality of information elements so that each data block comprises at least information element from said root guide information, and a control means wherein route guidance is executed using alternative route guidance information when said received route guidance information contains route guidance information which is not applicable for executing route guidance.

31. A communication terminal which receives route guidance information generated in an apparatus for providing route guidance information and which executes route guide according to said route guidance information, said communication terminal comprising:

a communication means for receiving route guidance information generated as information corresponding to an effective segment length adjusted according to an established condition, and a control means for executing route guidance based on said received route guidance information.

32. A method for providing route guidance information to a communication terminal, said method comprising:

extracting and reading out, from an information data storage unit, a plurality of information elements for use in route guidance, each of said elements having an information class specified for classifying said elements;

correlating each of said information classes to a guide level used as an indicator for sending said route guidance information;

generating guide information data blocks using said plurality of information elements that were read out, each of said blocks including information elements correlated to one guide level; and transmitting, in a sequence according to said guide levels, said guide information data blocks as route guidance information.

33. A method for providing route guidance information to a communication terminal, said method comprising:

adjusting an effective segment length for said route guidance information according to an established condition to generate route guidance information corresponding to the adjusted length, and sending said route guidance information to said communication terminal.

* * * * *